United States Patent [19]

Kataoka et al.

[11] Patent Number: 5,476,232

[45] Date of Patent: Dec. 19, 1995

[54] PHOTO FILM CASSETTE HAVING A SHELL HALF RETAINING DEVICE

[75] Inventors: Hideaki Kataoka; Tetsuya Takatori; Tomoyuki Takahashi; Tetsuya Tanaka, all of Kanagawa, Japan

[73] Assignee: Fuji Photo Film Co., Ltd., Kanagawa, Japan

[21] Appl. No.: 213,579

[22] Filed: Mar. 16, 1994

[30] Foreign Application Priority Data

Mar. 17, 1993 [JP] Japan ..................................... 5-057407

[51] Int. Cl.$^6$ ................................................. G11B 23/107
[52] U.S. Cl. ......................................... 242/348.4; 354/275
[58] Field of Search .............................. 242/348.1, 348.4, 242/588.3, 588.5, 588.6; 354/275

[56] References Cited

U.S. PATENT DOCUMENTS

| | | | |
|---|---|---|---|
| 3,631,971 | 1/1972 | Rinkleib | 242/348 X |
| 3,945,584 | 3/1976 | Mangan | 242/71.1 |
| 4,420,120 | 12/1983 | Raymond | 242/348.4 |
| 4,832,275 | 5/1989 | Robertson | 242/71.1 |
| 4,834,306 | 5/1989 | Robertson et al. | 242/71.1 |
| 4,875,638 | 10/1989 | Harvey | 354/275 X |
| 4,938,429 | 7/1990 | Robertson et al. | 354/275 X |
| 5,053,795 | 10/1991 | Wyman | 242/348.4 X |
| 5,232,175 | 8/1993 | Zander et al. | 242/348.4 |
| 5,251,839 | 10/1993 | Zander et al. | 354/275 X |
| 5,265,819 | 11/1993 | Enomoto et al. | 242/71.1 |
| 5,296,887 | 3/1994 | Zander | 354/275 |
| 5,317,355 | 5/1994 | Zander et al. | 242/348.4 X |
| 5,319,407 | 6/1994 | DiRisio | 242/348.4 X |
| 5,320,300 | 6/1994 | Gorman et al. | 242/348.1 |

FOREIGN PATENT DOCUMENTS 2-41619   11/1990   Japan.

Primary Examiner—Daniel P. Stodola
Assistant Examiner—William A. Rivera
Attorney, Agent, or Firm—Sughrue, Mion, Zinn, Macpeak & Seas

[57] ABSTRACT

A photo film cassette contains a spool in rotatable fashion, with a photo film wound thereabout as a roll. Rotation of the spool in an unwinding direction causes the photo film to exit through a passage port. Upper and lower shell halves constitute a cassette shell. Two combinations of a retaining hook and a receiving portion are disposed on the cassette shell and respectively beside the passage port. Both hooks are formed on the lower shell half. Both receiving portions are formed on the upper shell half, are engaged with the hook, and fixedly secure the shell halves. The hooks and the receiving portions are shaped straight along a width of the photo film. A pair of second receiving portions are formed on the upper shell half, and are engaged with the hooks prior to engagement of the first receiving portions with the hooks. The second receiving portions keep the upper shell half partially separate from the lower shell half, and retain the shell halves in preliminary fashion, before the shell halves are joined up. In a preferred embodiment, a hinge section is disposed in the cassette shell in opposition to the passage port, and connects the shell halves in swingable fashion. Two access openings are formed in the cassette shell for rendering the hooks respectively accessible externally, to allow external disengagement of the hooks.

21 Claims, 22 Drawing Sheets

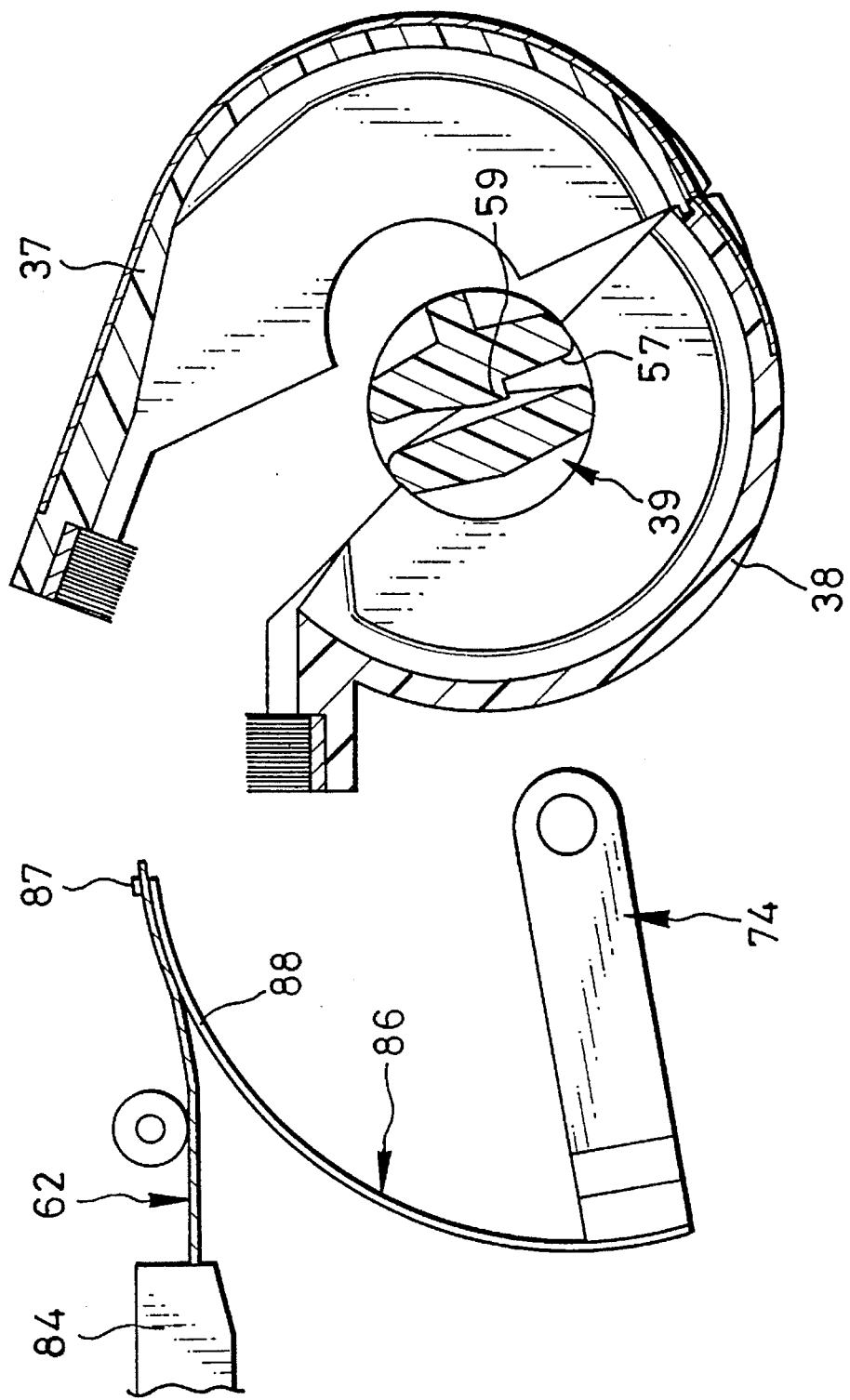

PHOTO FILM CASSETTE HAVING A SHELL HALF RETAINING DEVICE

BACKGROUND OF THE INVENTION

1. Field of the Invention

The present invention relates to a photo film cassette. More particularly, the present invention relates to a photo film cassette of which a cassette shell is constituted of a plurality of shell parts joined together.

2. Description Related to the Prior Art

A 135 type photo film cassette is most widely used among other photo film cassettes, and consists of a cassette shell, a spool and photo film. The cassette shell has a metal tube and a pair of caps fitted on respective ends of the tube. A trailer of the photo film is retained on the spool, and contained in the cassette shell rotatably with the spool. When a photographer uses up the photo film after photography, he deposits the cassette to a photofinisher. In a photo laboratory, the entirety of the photo film is taken out of the cassette shell, cut off from the spool in a position exterior to a photo film passage port of the cassette, and subjected to processing for development and printing of photographs. After the photo film is developed, the photo film is cut off at a regular shorter length, inserted into photo film sheaths, and returned to the photographer.

U.S. Pat. Nos. 4,634,306 and 4,832,275 suggest a leader-advancing photo film cassette, in which a leader of the photo film is entirely pre-contained in a cassette shell, and when a spool is rotated, responsively the leader is advanced to the outside of the cassette shell. It has been proposed, as in U.S. Pat. No. 5,265,819 (corresponding to JP-A 4-362939), to construct such a cassette shell by use of a pair of molded shell halves, which are joined together fixedly in clicked fashion, so joined as to form a passage port like a slot for the photo film between the shell halves. Beside the passage port, a juncture of joining the shell halves is provided with a stepped structure, constituted of a groove in a first shell half and a ridge formed on a second shell half for being fitted in the groove. This stepped structure is formed to extend in a lengthwise direction of the photo film.

The developed photo film, as cut off and inserted into photo film sheaths, has an inconvenience in preservation, as the photo film cannot be folded in a still shorter size. A preserving cassette for a developed photo film is suggested in a commonly assigned co-pending patent application U.S. Ser. No. 07/910,914 (corresponding to JP-A 5-19441), for containing the developed photo film in roll form without being cut down into pieces. A preserving cassette has a cassette shell, a spool, an openable port lid for closing a passage port, and a leader-advancing structure for advancing the leader in response to rotation of the spool. The openable port lid is opened at a spacing enough for passage of the leader, and allows the leader advancement during the rotation of the spool.

The use of the preserving cassette with the ordinary photo film cassette sometimes has tendency of raising the amount of labor in handling the cassettes in photo laboratories, because the different cassettes must be discerned in handling suitably for the status of the photo film to be contained. This requires a dual-purpose cassette constructed to be convenient for containing both the undeveloped photo film and the developed photo film.

It is suggested in a commonly assigned co-pending patent application U.S. Ser. No. 08/091,626 to facilitate retention of a trailer of photo film on a spool and facilitate removal of the trailer from the spool. It would be conceivable to use an automatic photo film removing/loading device proposed in the co-pending application, with great convenience, for removing such a dual-purpose cassette from, and loading it with, the photo film. This removing/loading device is provided with a trailer separator/inserter which has an arcuate shape, which is inserted through a passage port, by which the spool within a cassette shell is accessed, and effects removal and retention of the trailer.

However, movement of the trailer separator/inserter through the passage port requires high precision in control of the separator/inserter, because the passage port has such a small space. The removing/loading device of high precision is obliged to be manufactured at a high expense. The automation in moving the trailer through the passage port also has problem in that plush or light-trapping ribbons inside the passage port may be damaged by the trailer separator/inserter of the removing/loading device. The damaged plush may make it impossible to exit the leader through the passage port even when the spool is rotated.

The construction of the leader-advancing cassette by use of two molded shell halves has a problem in automation in handling of the cassette shell: handling of the separate two shell halves to be joined is complicated, and raises the cost and size of the removing/loading device. If the stepped structure, formed between the shell halves, located beside the passage port and constituted of the groove and the fittable ridge, cannot be utilized for facilitation in handling of the cassette shell. Should the stepped structure be fitted together for conveyance of the cassette shell before loading of the photo film, the shell halves must be separated for being loaded with the photo film. To disengage the stepped structure would be by no means practical, because it is firmly engaged and inappropriate for preliminary use.

SUMMARY OF THE INVENTION

In view of the foregoing problems, an object of the present invention is to provide a photo film cassette of which a cassette shell is constituted of two molded shell halves and can be easily handled in course of production of the cassette.

Another object of the present invention is to provide a photo film cassette into which a trailer separator/inserter of a photo film removing/loading device can be easily inserted.

Still another object of the present invention is to provide a photo film cassette of which a clicked structure for retaining the shell halves is prevented from being damaged.

An additional object of the present invention is to provide a photo film cassette in which no ambient light is leaked into the cassette shell through portions beside the passage port.

Further object of the present invention is to provide a photo film cassette usable with convenience for containing the photo film both before and after development.

In order to achieve the above and other objects and advantages of this invention, first and second shell halves constitute the cassette shell. Hinge means connects the shell halves in swingable fashion, with the passage port located in the cassette shell in opposition to the hinge means. Two retaining means are disposed on the cassette shell and respectively beside the passage port, for fixedly securing the shell halves. Each of the retaining means is constituted of a retaining claw disposed on the first shell half, and a receiving portion formed on the second shell half and engaged with the retaining claw for retaining the retaining claw. Two access openings are formed in the cassette shell for rendering the retaining means respectively accessible externally, to allow external disengagement of the retaining means. Therefore, the clicked structure for retaining the shell halves is prevented from being damaged.

In a preferred embodiment, the retaining claw and the receiving portion are shaped to be substantially straight along a width of the photo film. Even when the joined shell halves do not coincide in the widthwise direction of the photo film with high precision, the retaining structure makes it possible to form the passage port with sufficient precision. Ambient light thus will not leak into the cassette shell through portions beside the passage port.

A second receiving portion is formed on the second shell half, and engaged with the retaining claw prior to engagement of the receiving portion with the retaining claw. The second receiving portion keeps the shell halves partially separate from one another, to retain the shell halves in preliminary fashion, before the shell halves are joined up. It is easy to handle the cassette shell in course of production of the cassette. A trailer separator/inserter of a photo film removing/loading device can be easily inserted into the photo film cassette.

At least one covering member is mounted on the cassette shell in removable fashion, for covering the access openings partially, to hinder access to the retaining means. When the covering member is cut off, it signals that the cassette contains the developed photo film. The cassette can be used with convenience for containing the photo film both before and after development.

Various structures for retaining shell halves are disclosed in U.S. Pat. No. 3,945,584, U.S. Pat. No. 5,265,819 and JP-Y 41619. U.S. Pat. No. 3,945,584 discloses a construction in which a first one of two shell halves has retaining claws in front and rear positions, the second of the shell halves has claw receiving portions, and two shell halves are retained by engaging the retaining claws on the receiving portions in clicked fashion. However, the retaining structure of this disclosure is unadvantageous because the disengagement of the retaining structure requires laborious operation. The retaining claws must be bent away from the receiving portions before the shell halves could be separated. A small screwdriver would be applied to the retaining claws, to release them from the receiving portions. However, it would be highly possible for the screwdriver to break or damage the retaining claws, as nothing is formed for guiding the tip of screwdriver.

Should the shell halves according to this disclosure be safely separated, the shell halves would be completely apart without any device for maintaining a preliminary connection between them. The thorough separation of the shell halves require much labor in handling. There is a possibility of losing one of the two shell halves to be mated.

U.S. Pat. No. 5,265,819 (corresponding to JP-A 4-362939) discloses a construction which is similar to U.S. Pat. No. 3,945,584, but in which retaining claws are engaged with receiving portions in clicked but disengageable fashion. In this disclosure, however, there remain the same problems as U.S. Pat. No. 3,945,584.

In contrast, the novel cassette is provided with the hinge means, the retaining claws, the receiving portion and the access openings, so that the clicked structure for retaining the shell halves is prevented from being damaged.

JP-Y 2-41619 discloses a construction in which two shell halves are connected via a thin connecting portion formed in a rear position, and are retained by clicked engagement in a front position. However, there is the same problem as U.S. Pat. No. 3,945,584 in that external operation would break or damage the retaining claws. Further the rear thin connection for interconnecting the shell halves is weak. Thus the repeated opening and closing movements of the shell halves will generate stresses in the thin connection and finally break the connection, so as to separate the shell halves.

In the present invention, however, the hinge means includes a bearing member projected from either the first or the second shell half. A shaft member is disposed on a shell half different from the bearing member for supporting the bearing member in swingable fashion on the latter shell half. Therefore the hinge means can resist to repeated opening and closing movement of the shell halves.

BRIEF DESCRIPTION OF THE DRAWINGS

The above objects and advantages of the present invention will become more apparent from the following detailed description when read in connection with the accompanying drawings, in which:

FIG. 21B is an explanatory view in section illustrating the insertion of the photo film into the cassette;

DETAILED DESCRIPTION OF THE PREFERRED EMBODIMENTS OF THE PRESENT INVENTION

Figure 1:
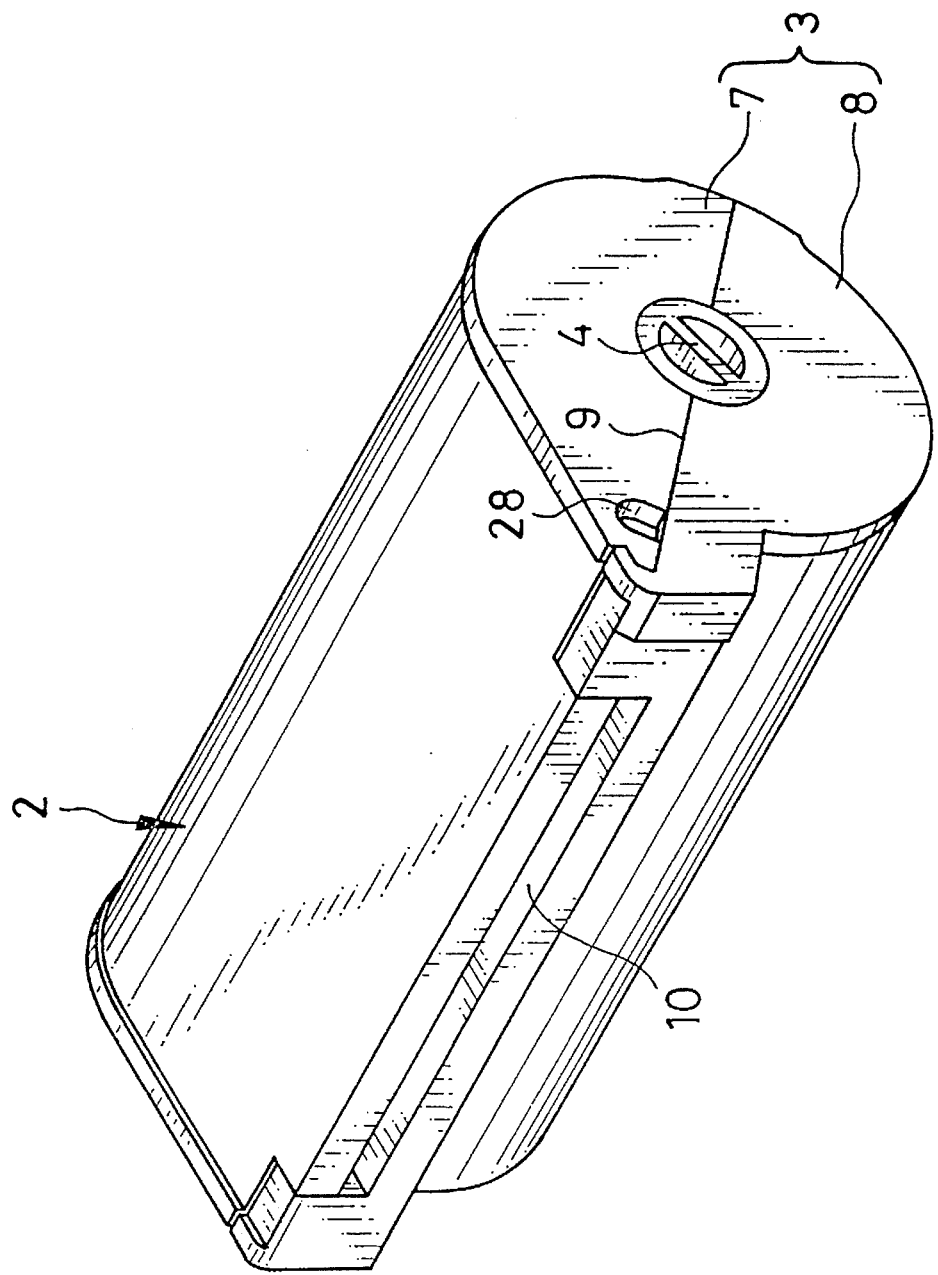
FIG. 1 is a perspective view illustrating a photo film cassette of the present invention.
Figure 2:
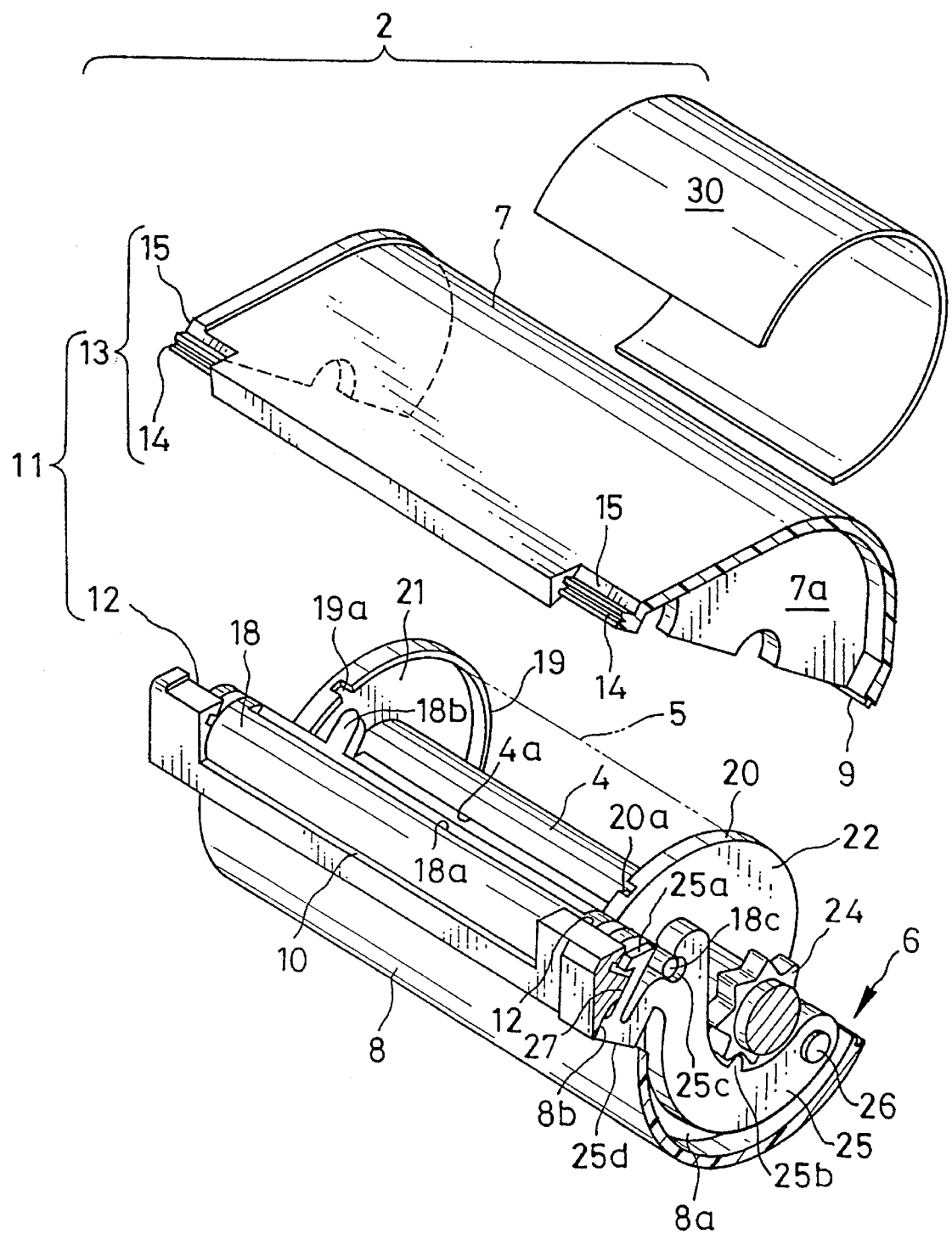
FIG. 2 is an exploded perspective view illustrating the photo film cassette of FIG. 1.
Figure 3:
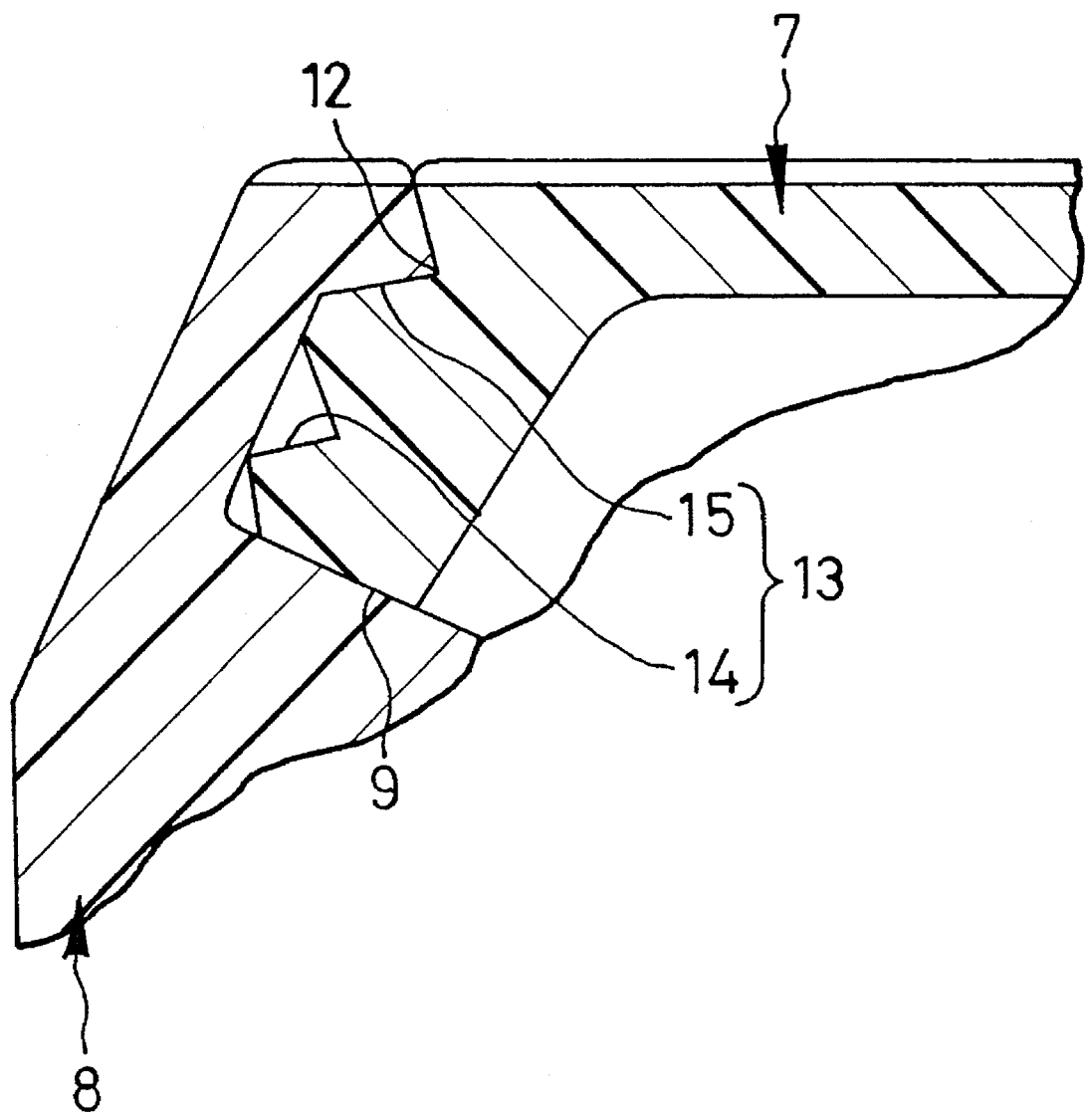
FIG. 3 is an explanatory view in section illustrating a state where retaining hooks are engaged with receiving portions for complete junction.

FIGS. 1 and 2 illustrating a photo film cassette 2, which is constituted of a cassette shell 3, a spool 4 rotatably contained in the cassette shell 3, photo film 5 wound on the spool 4 to be a roll, and a mechanism 6 for locking the spool. The cassette shell 3 consists of a pair of shell halves 7 and 8, inside which there are formed partitions 7a and 8a. The inside of the cassette shell 3 are separated by the partitions 7a and 8a into two chambers respectively for containing the photo film 5 and for containing the spool lock mechanism 6.

The shell halves 7 and 8 are formed from resin, and joined on a juncture 9, which lies on a plane surface to be co-planar with a rotational axis of the spool 4. The juncture 9 is partially constituted of a photo film passage port 10, which is formed between the shell halves 7 and 8 as a slot and communicates with the roll chamber. In positions beside the passage port 10 along the juncture 9, there are disposed a pair of retaining structures 11 for securing the shell halves 7 and 8 together in releasable fashion. Each retaining structure 11 consists of combination of a retaining hook 12 formed on the lower shell half 8 resiliently and a receiving section 13 formed on the upper shell half 7. The retaining hook 12 and the receiving section 13 are shaped in forms with contours defined in straight lines parallel to a widthwise direction of the photo film 5, and are elongated in this direction.

The pair of the retaining hooks 12 and the pair of the receiving sections 13 are formed symmetrically. When measured from lateral ends of the passage port 10, the retaining hook 12 and the receiving section 13 have a range from 0.5 to 10 mm, preferably from 2 to 8 mm, desirably 3 to 7 mm. Should the retaining hook 12 and the receiving section 13 be close to the passage port 10 at the distance below 0.5 mm, they would have insufficient intensity. Should the retaining hook 12 and the receiving section 13 be extended in a range from 10 mm from the passage port 10, they would enlarge the size of the cassette shell 3 too much to be loaded into a camera. In end faces and a rear face of the cassette shell 3, the juncture 9 is so constructed that the upper shell half 7 has a groove into which a ridge of the lower shell half 8 is fitted. A sticker or label 30 is adhered to the outside of the shell halves 7 and 8. Note that the sticker 30 is omitted from FIG. 1 for the purpose of clarity of the drawing.

The receiving section 13 includes two receiving portions 14 and 15. The receiving portion 15 is resiliently engaged with the retaining hook 12 to join the shell halves 7 and 8 completely. The receiving portion 14 is used for preliminary fashion and resiliently engaged with the retaining hook 12 to keep the juncture 9 between the shell halves 7 and 8 partially open. Once the receiving portion 15 is engaged with the retaining hook 12, ambient light is shielded from the juncture 9 between the shell halves 7 and 8, and prevented from fogging the photo film 5. When the receiving portion 14 in turn is engaged with the retaining hook 12, it is easy to handle the cassette shell 3 by grasping only either of the shell halves 7 and 8. It is also easy to disengage the receiving portion 14 for the purpose of opening the cassette shell 3 completely, after the conveyance of the still empty cassette shell 3.

Figure 4:
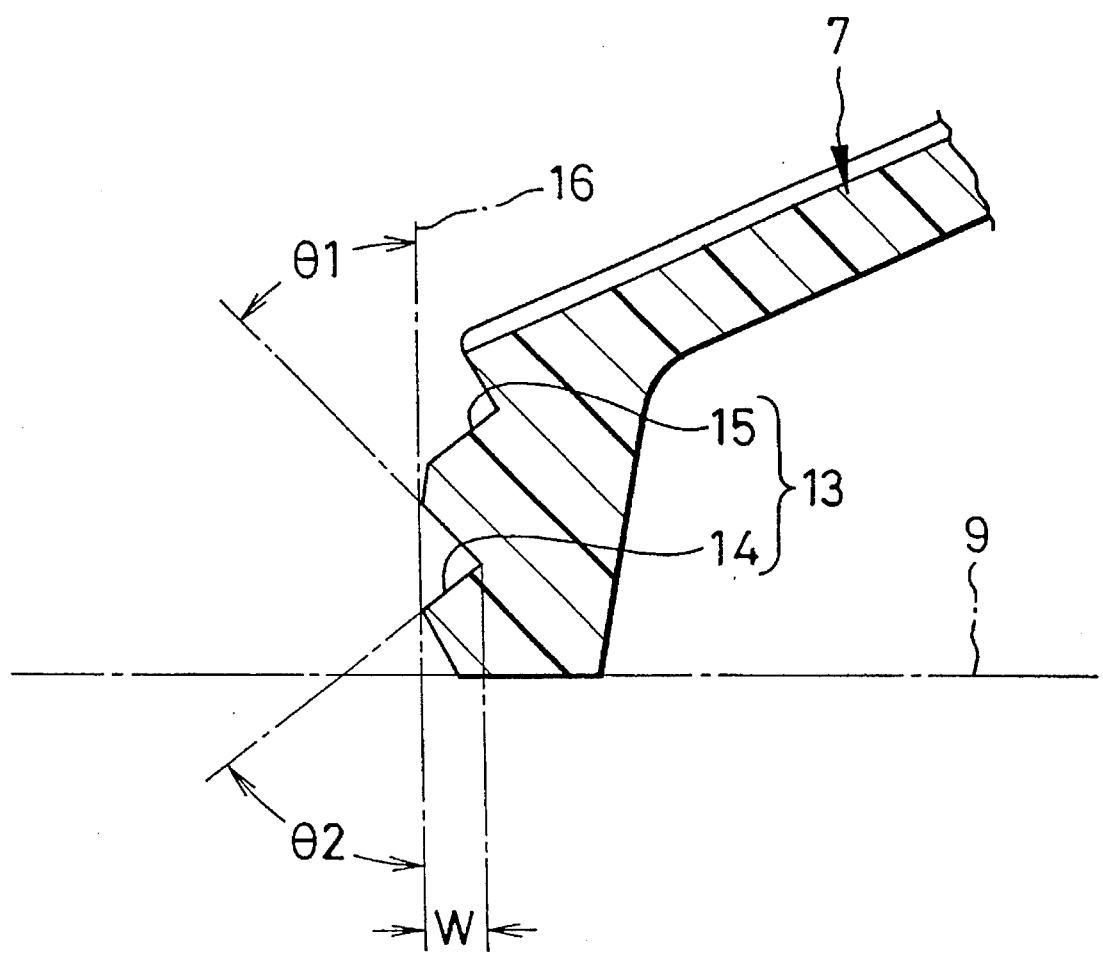
FIG. 4 is an explanatory view in section illustrating a general shape of receiving sections each having two portions.
Figure 5:
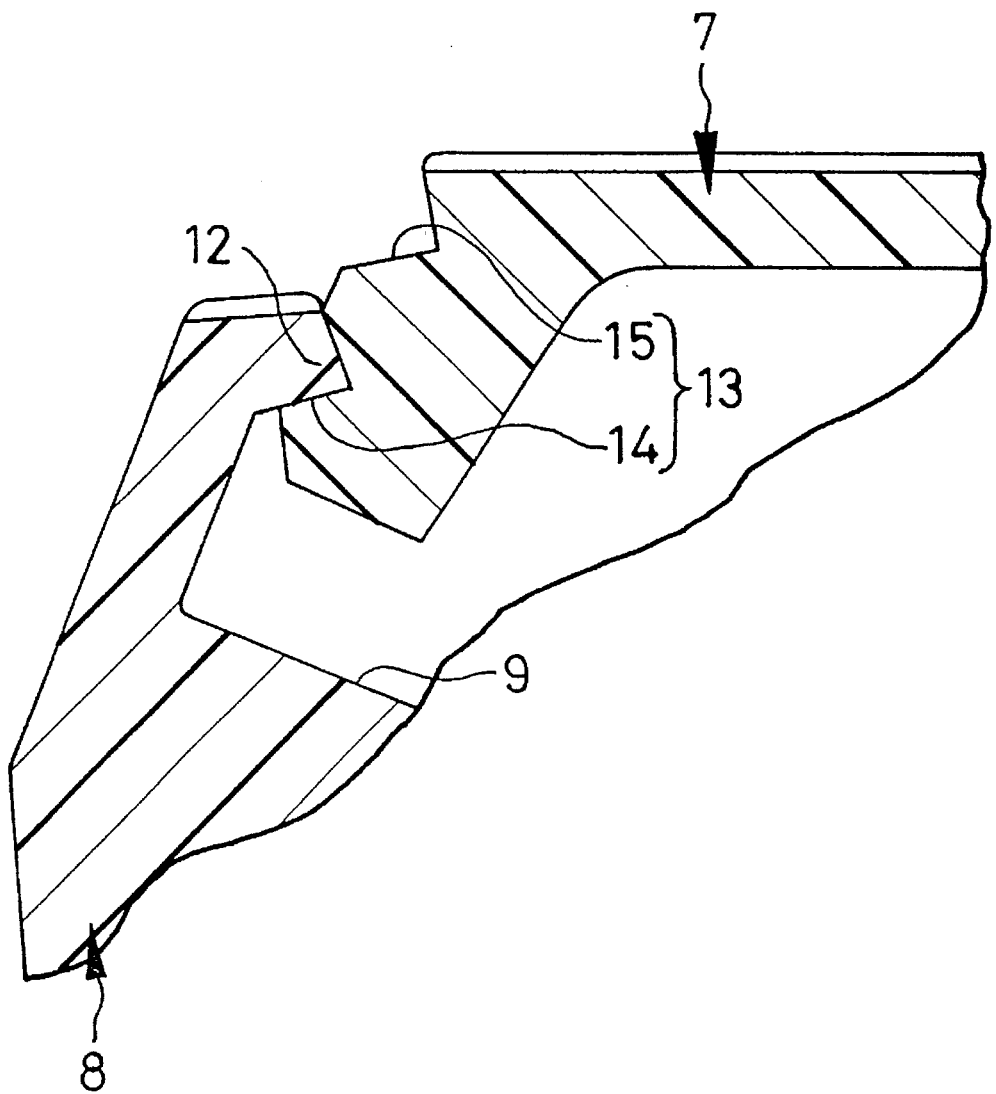
FIG. 5 is an explanatory view in section illustrating a state where the retaining hook is engaged with receiving portion for preliminary use.

The receiving portion 14 has a shape of a V-notch when viewed in cross section in FIG. 4. Let a straight line 16 intersect vertically the juncture 9. Let 81 and 82 be angles defined by the receiving portion 14 relative to the line 16. The angles $\Theta 1$ and $\Theta 2$ are respectively determined in a range from 10 to 60 degrees, preferably from 30 to 45 degrees. The depth W of the receiving portion 14 is from 0.1 to 0.7 mm, preferably from 0.3 to 0.5 mm. The retaining hook 12 has such a size as to be fitted suitably in the receiving portion 14, as illustrated in FIG. 5.

Distal ends of the spool 4 appear through the cassette shell 3. When a camera is loaded with the cassette, either of spool ends are rotated by a drive shaft of the camera, in directions of advancing and rewinding the photo film 5. The spool 4 is inserted through two resinous disks 21 and 22. The disks 21 and 22 are provided with circumferential lips 19 and 20, which are in contact with the roll of the photo film 5 so as to prevent the outer turns from loosening around the spool 4. When the spool 4 is rotated in the unwinding direction, the roll is also rotated in the cassette shell 3. The disks 21 and 22 are partially retained on the inside of the cassette shell 3, and is kept stationary even during rotation of the spool 4. The lips 19 and 20 have respective notches 19a and 20a, through which the photo film 5 is passed toward the passage port 10. The spool 4 has a slot 4a into which a trailer of the photo film 5 is received. As is illustrated in FIG. 6, hooks or claws 4b are formed in the slot 4a for being engaged with holes in the trailer to retain the trailer the on the spool 4.

Figure 6:
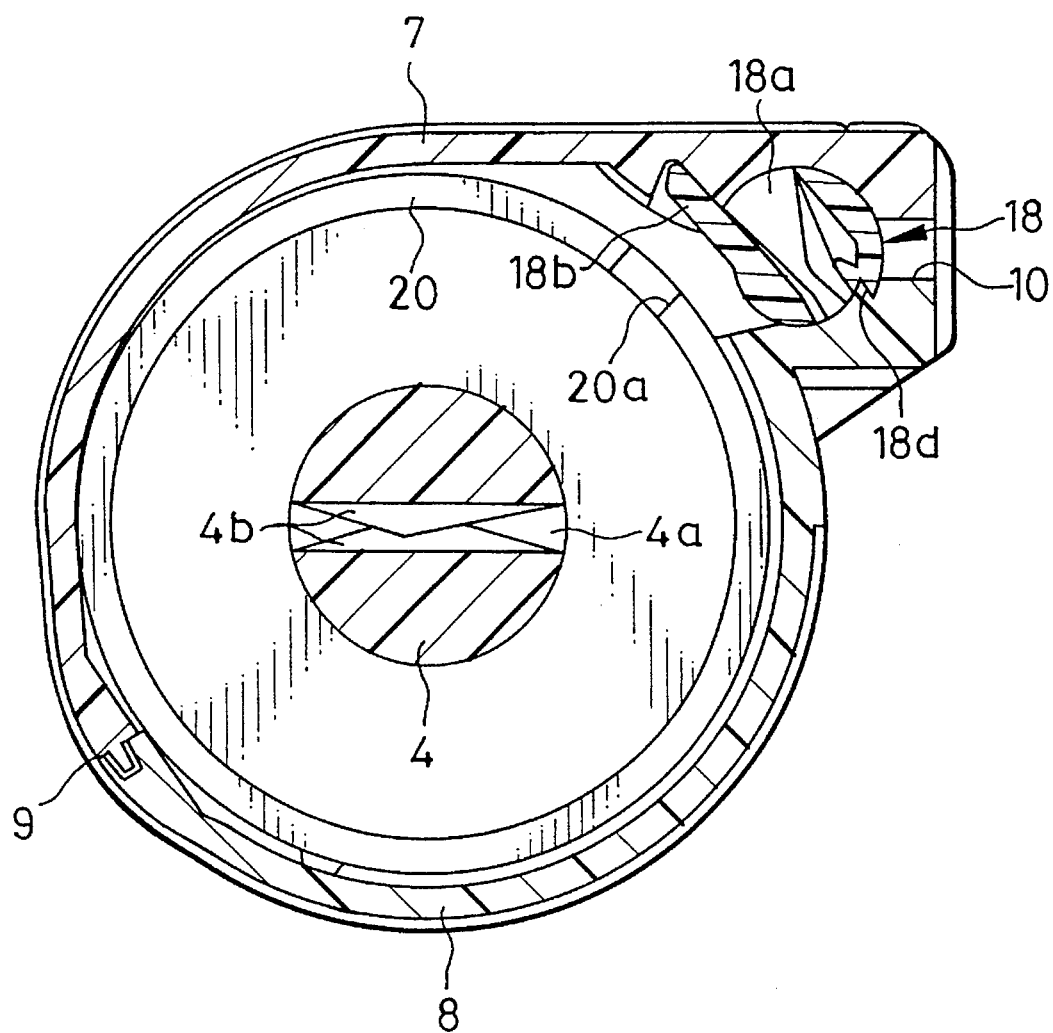
FIG. 6 is a cross section illustrating the photo film cassette of which a shutter rod stands closed.
Figure 7:
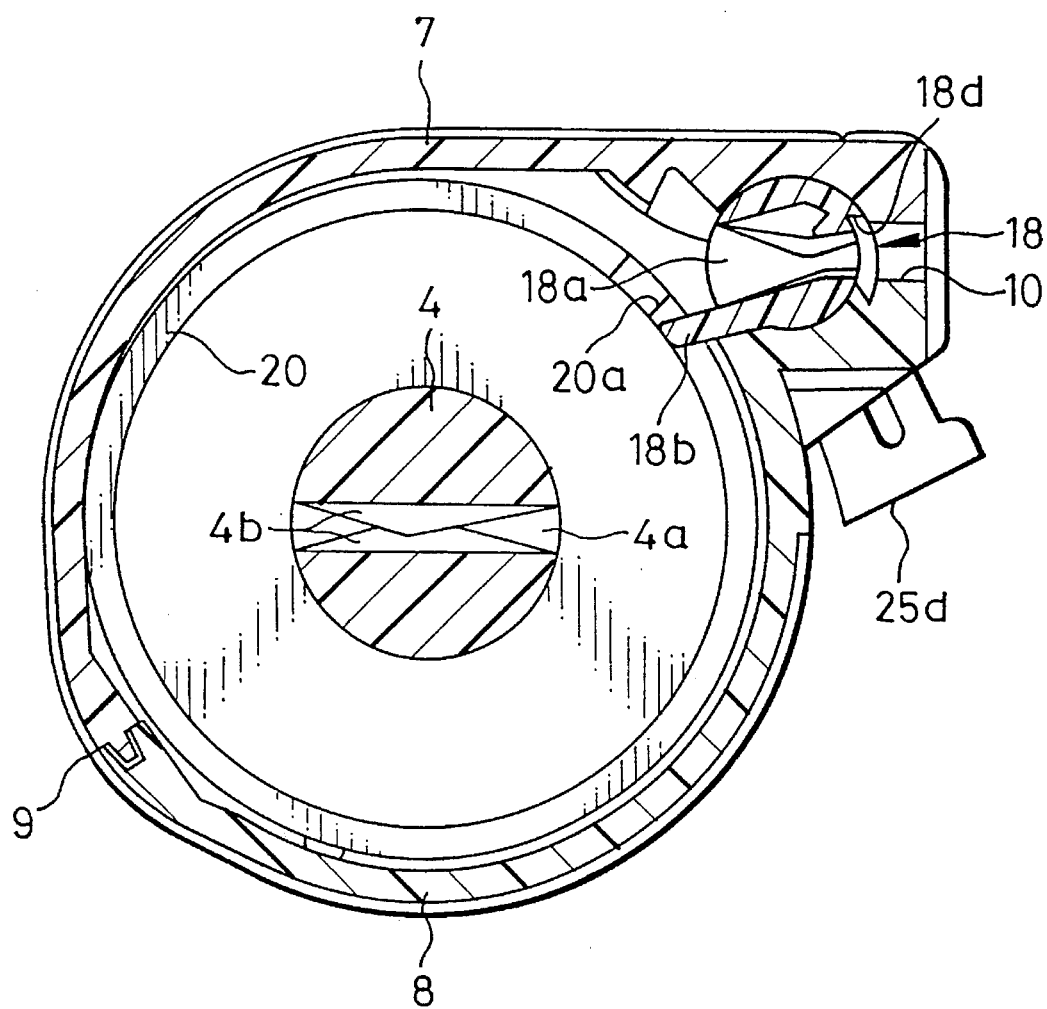
FIG. 7 is a cross section illustrating the photo film cassette of which the shutter rod stands open.

Referring to FIGS. 6 and 7, the passage port 10 is provided with a shutter rod 18 for opening/closing the passage port 10. The shutter rod 18 is resinous, and has a slot 18a of which a length is sufficiently greater than the width of the photo film 5. Distal ends of the shutter rod 18 constitutes rotational shafts, which are supported by bearing portions of shell halves 7 and 8. The shutter rod 18 is rotatably between an open position for opening the passage port 10 and a closed position for closing the passage port 10. When the shutter rod 18 stands closed, ambient light is prevented from passing through the passage port 10 and shielded from the inside of the cassette shell 3. The shutter rod 18 is provided with a separator claw 18b for separating a leading end of the photo film 5 from the roll. A pin 18c (see FIGS. 8 and 9) is projected from the shutter rod 18 into the chamber containing the spool lock mechanism 6. The pin 18c does not coincide with a rotational center of the shutter rod 18. The shutter rod 18 also has a stopper portion 18*d* formed in a stepped shape to be directed to the outside. When the shutter rod 18 stands open, the stopper portion 6*d* comes in contact with the lower shell half 8 to stop further rotation of the shutter rod 18. Note that the film 5 is omitted from FIGS. 6 and 7 for clarity of the drawings.

Figure 8:
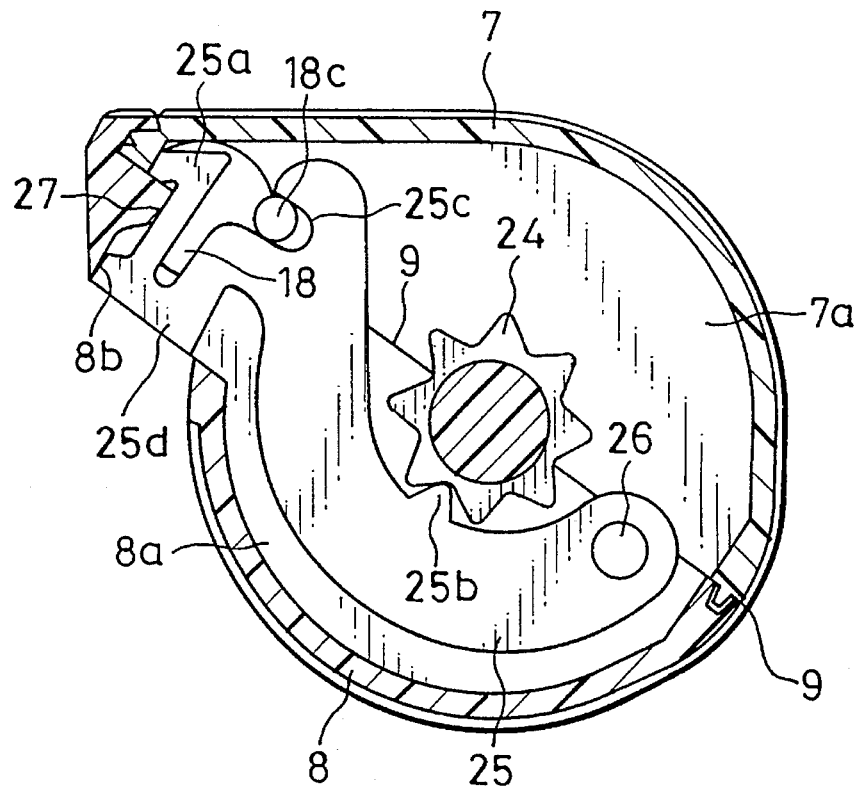
FIG. 8 is a cross section illustrating the photo film cassette of which a spool is locked.
Figure 9:
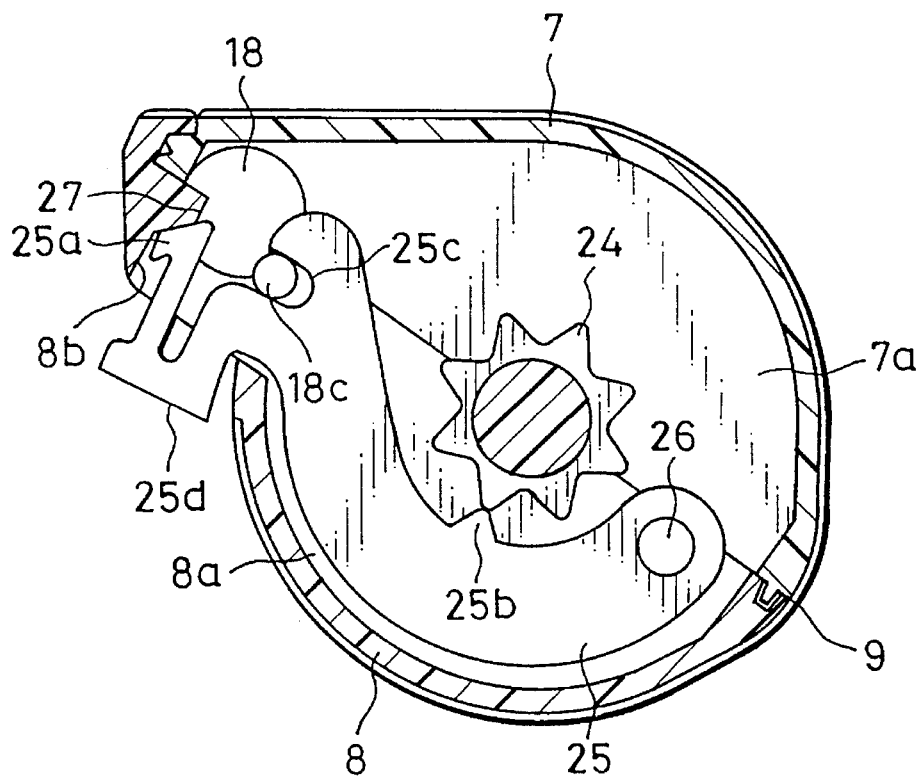
FIG. 9 is a cross section illustrating the photo film cassette of which the spool is unlocked.
Figure 10:
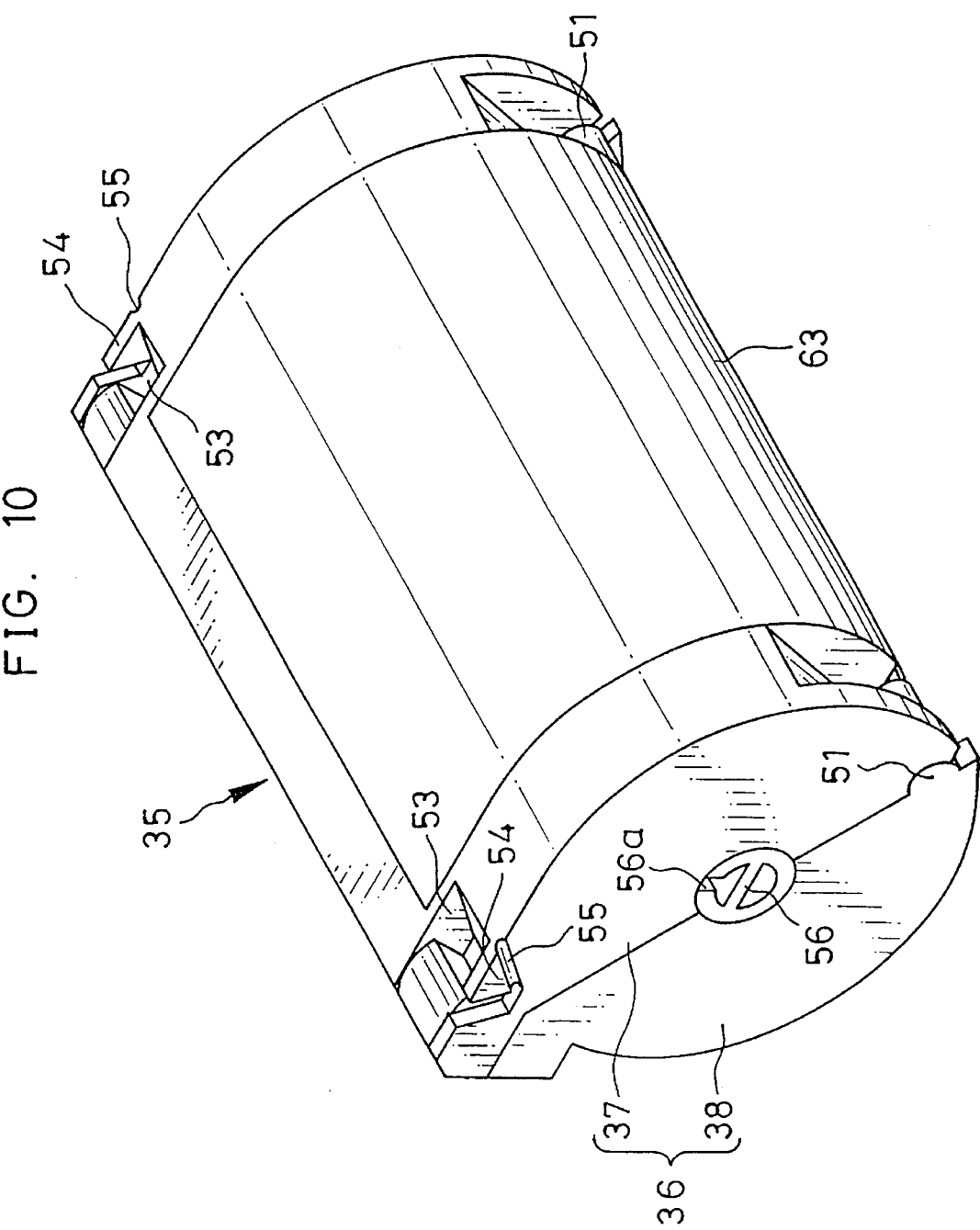
FIG. 10 is a perspective view illustrating another preferred photo film cassette.
Figure 11:
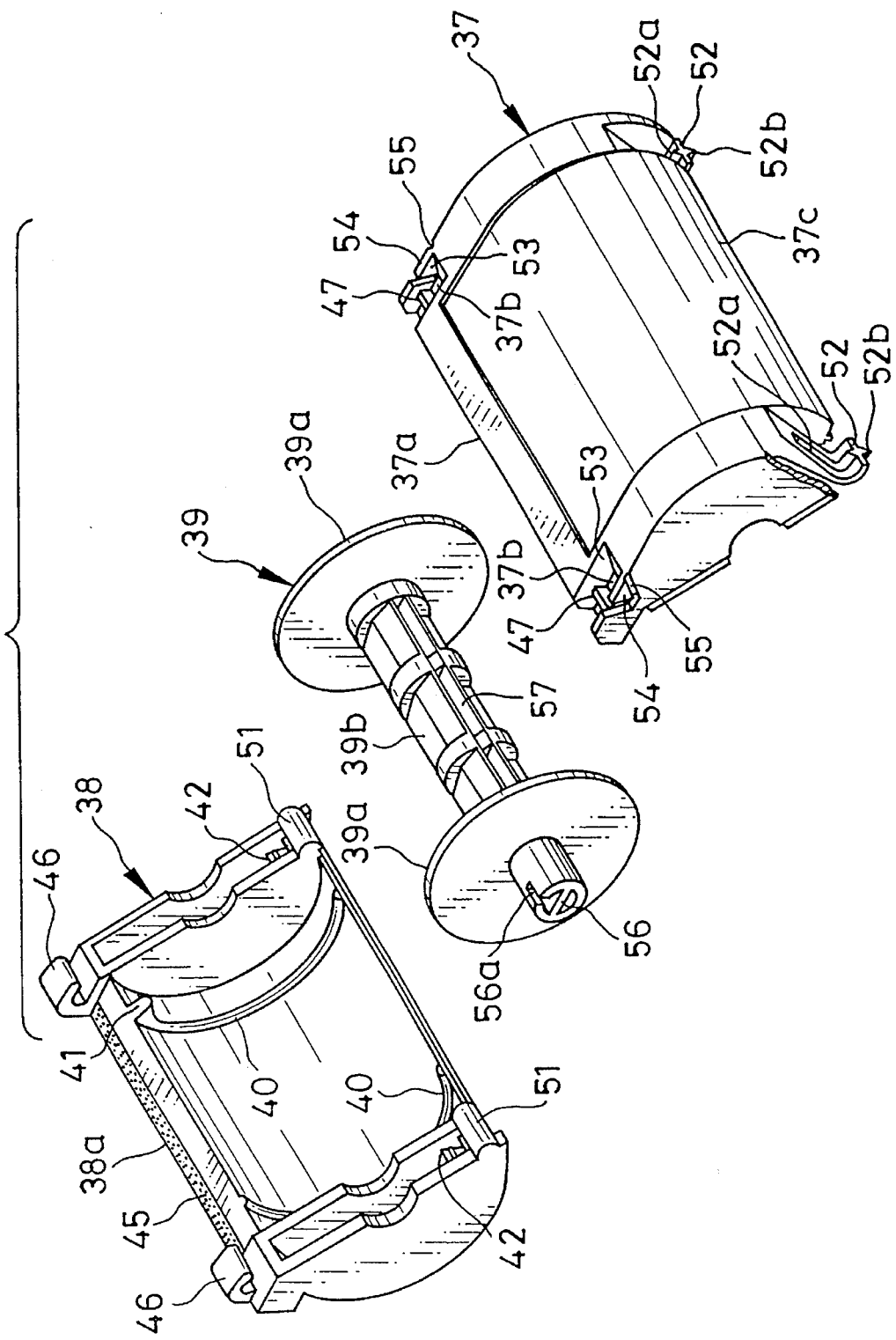
FIG. 11 is an exploded perspective view illustrating the photo film cassette of FIG. 10.
Figure 12:
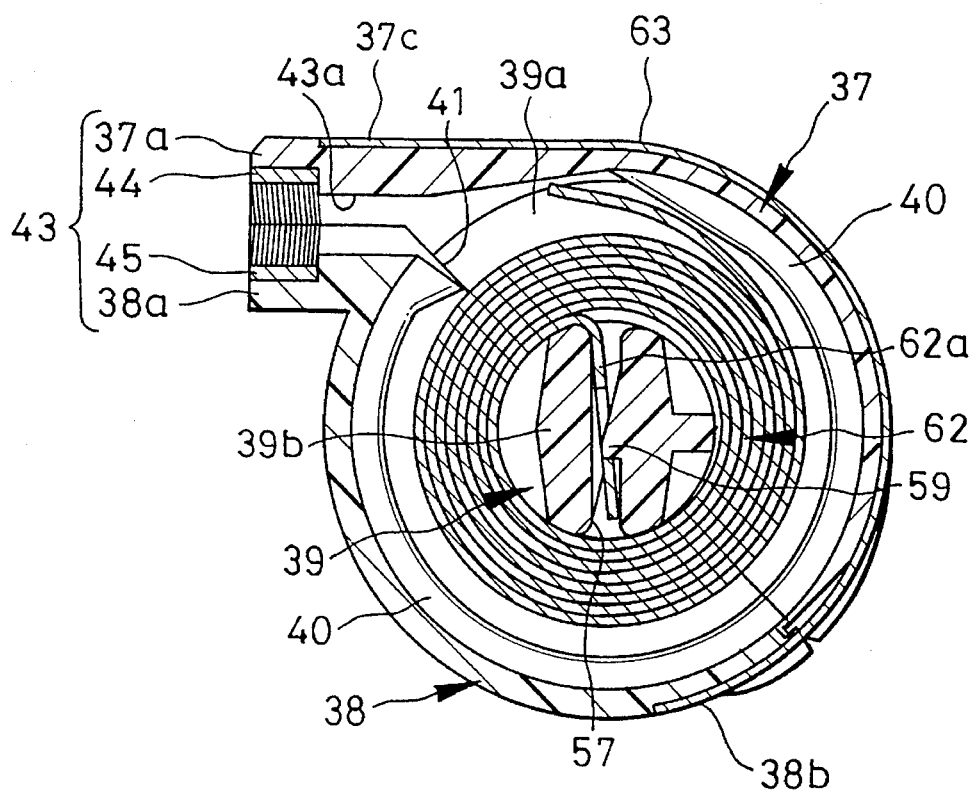
FIG. 12 is a cross section illustrating the photo film cassette.
Figure 13:
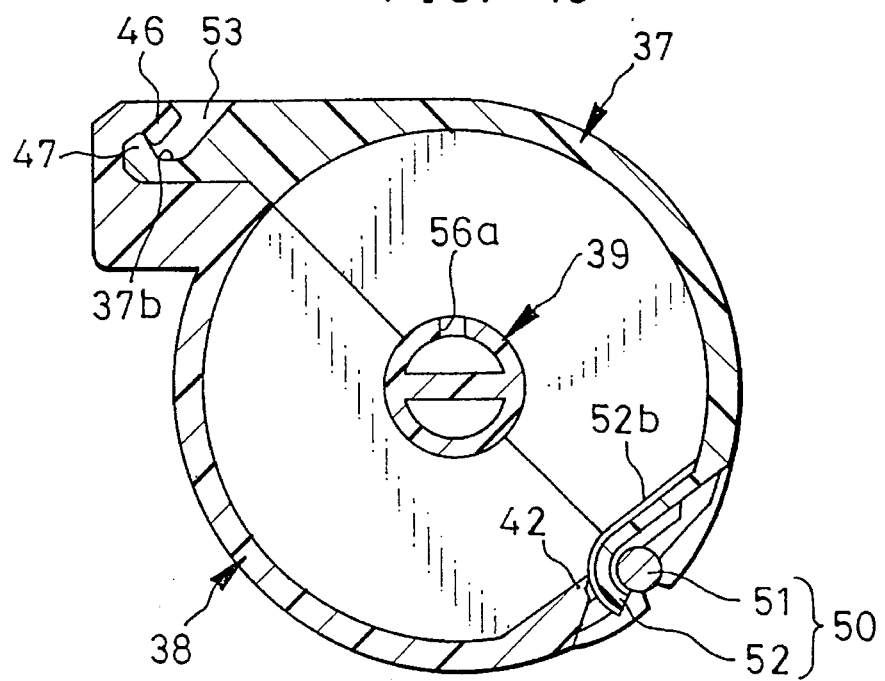
FIG. 13 is a cross section illustrating the photo film cassette at a retaining section and a hinge section.

Referring to FIGS. 8 and 9, the spool lock mechanism 6 is constituted of a gear 24 formed around the spool 4, and a lock lever 25 which is swingably supported on a shaft 26 disposed on the partition 8*a*. The lock lever 25 has an arcuate shape, of which a distal end is formed as a hook 25*a*. The hook 25*a* is flexible in the direction of the thickness. A latch claw 25*b* is formed at the middle of the lock lever 25 to be engageable with the gear 24. When the cassette 2 stands as in FIG. 8, the claw 25*a* is engaged with a retaining portion 27 inside the lower shell half 8. The latch claw 25*b* is engaged with the gear 24. The hook 25*a* is depressed in the direction of thickness, that is, to the left as viewed in FIG. 2, by external access through an opening 28 (see FIG. 1) in the upper shell 7, until it is disengaged from the retaining portion 27. The lock lever 25 is released to be swingable about the shaft 26.

To access the lock lever 25, a camera is provided with a release pin. The cassette 2 is inserted in the camera. Once a bottom lid is closed, the release pin is inserted into the opening 28 of FIG. 1 for disengagement of the hook 25*a*. A drive shaft of the camera is engaged with the spool 4, and rotates the spool 4 in the counterclockwise direction in FIG. 1. The gear 24 is rotated and presses the latch claw 25*b*, until the lock lever 25 is rotated from a locking position to an unlocking position. A receiving recess 25*c* formed in the lock lever 25 receives the pin 18*c* movably. When the lock lever 25 is swung, the pin 18*c* is rotated by the receiving recess 25*c* to rotate the shutter rod 18 to the open position as depicted in FIG. 7. The lock lever 25 has a driven portion 25*d* movable through an opening 8*b* formed in the lower shell half 8. The camera is provided with another pin for pressing the driven portion 25*d*. Once the driven portion 25*d* is pressed, the lock lever 25 is swung to the lock position as depicted in FIG. 8. Responsively the shutter rod 18 is driven and rotated to the closed position as depicted in FIG. 6.

The operation of the above construction is described now, which is based mainly on that proposed in the commonly assigned co-pending application U.S. Ser. No. 08/091,626. An automatic line of manufacturing the photo film cassette 2 is constituted of a molding process, an assembling process, a loading process and a packaging process. The molding process forms the shell halves 7 and 8, the disks 21 and 22, the spool 4, the shutter rod 18 and the lock lever 25, which are conveyed automatically to the assembling process. In this conveyance, the shell halves 7 and 8 are retained together in preliminary fashion by engagement of the receiving portion 14 and the retaining hook 12 as illustrated in FIG. 5. The preliminary retention can be made with great ease by use of the resiliency of the retaining hook 12. The cassette shell 3 in the preliminary retention is kept integral and incompletely open, and automatically handled by a handling device to be conveyed to the assembling process.

In the assembling process, the preliminarily retained shell halves 7 and 8 are separated at a time. For this, the lower shell half 8 is fixedly placed while the upper shell half 7 is pulled away from the lower shell half 8. The lower shell half 8 is supplied with the spool 4 having the disks 21 and 22, the shutter rod 18 and the lock lever 25. The shell halves 7 and 8 are fitted along the juncture 9, and supplied with the sticker 30 adhered thereto. The upper shell half 7 is retained on the lower shell half 8 by use of the receiving portion 15 and the retaining hook 12. The straight arrangement of the receiving portions 15 and the retaining hooks 12 coincide with the straight arrangement of the passage port 10, so that the passage port 10 can be formed precisely without any gap. It is possible to shield the juncture 9 from ambient light beside the passage port 10.

The cassette shell 3 as assembled is conveyed to the loading process. The cassette shell 3 is positioned, of which the opening 28 is accessed by an external release jig, which depresses the spool lock mechanism 6. With the mechanism 6 released, the spool 4 is rotated at a small amount in a direction to unwind the photo film 5, so that the shutter rod 18 is turned to be open. In the meantime, a photo film loading device supports the photo film 5. The trailer of the photo film 5 is inserted into the passage port 10. The photo film loading device inserts the trailer into the slot 4*a* in the spool 4, where the trailer is retained. The spool 4 is rotated by the drive shaft, and winds the entirety of the photo film 5 into the cassette shell 3.

After loading of the photo film 5, the release jig is removed. An external pressing jig is next caused to press the driven portion 25*d* of the lock lever 25 into the opening 8*b*. Then the spool 4 becomes locked again, with the shutter rod 18 returned to stand closed. The photo film cassette 2 with the spool 4 locked is conveyed into the packaging process, where the cassette 2 is packaged for shipment.

A photographer having obtained the photo film cassette 2 loads a camera with it. The camera adapted to the novel cassette 2 is provided with a cassette containing chamber, the bottom lid for enclosing the bottom of the cassette containing chamber, the release pin disposed on the bottom lid for releasing the spool 4 from locking, and the drive shaft disposed inside the cassette containing chamber for rotating the spool 4.

The cassette 2 is inserted in the camera. Once the bottom lid is closed, the release pin is inserted into the opening 28, and disengages the hook 25*a*. The lock lever 25 is rotated to the unlocking position. The drive shaft of the camera rotates the spool 4. The gear 24 is rotated and presses the latch claw 25*b*. The lock lever 25 is swung from the state of FIG. 8 until the state of FIG. 9. The shutter rod 18 is rotated to the open position of FIG. 7 from the closed position of FIG. 6. The slot 18*a* communicates with the passage port 10, so as to render the passage port 10 effective.

In rotation of the spool 4, the roll of the photo film 5 rotates until the leading end abuts on the separator claw 18*b*. While the roll is regulated by the lips 19 and 20, the rotation forces the separator claw 18*b* to be between the leading end and the second outermost turn of the photo film 5. Thus the leading end is separated from the roll of the photo film 5, and directed through the notches 19*a* and 20*a*, into the passage port 10, and to the outside. The exited leading end is advanced into a passage gate inside the cassette containing chamber of the camera. The leading end of the photo film 5 comes to a take-up spool in the camera. In course of rotation of the take-up spool, the leading end is taken up thereby, because the leading end has perforations to be picked up the take-up spool, or has high friction in relation to the take-up spool sufficiently to be picked up. Further rotation of the take-up spool winds up the photo film 5 around the take-up spool. In course of advancement of the photo film, a first imaging frame to be created is set behind an exposure aperture. Upon this, the take-up spool is stopped. Note that the photo film 5 has a train of perforations formed at a pitch corresponding to that of imaging frames to be created. To set each of the imaging frames behind the exposure aperture, the position of the photo film 5 is controlled while checking the perforations by optical detection.

Each time an imaging frame is created, the photo film 5 is fed for next photography. After photography of a final imaging frame, the camera rotates the drive shaft in a direction reverse to unwinding. The spool 4 rotates to wind the entirety of the photo film 5 into the cassette shell 3. When the photographer commands the camera to open the bottom lid, the release pin of the camera is retracted from the cassette 2. The camera causes the pressing pin to press the driven portion 25d. The lock lever 25 returns to the locking position. With the spool 4 locked, the camera controls the bottom lid to be openable.

In the above embodiment, the receiving section 13 for receiving the retaining hook 12 is mainly utilized for convenience in manufacture of the cassette 2. Of course the receiving section 13 is also convenient for easy disassembly of the cassette 2, as the retaining hook 12 can be disengaged by use of an external disassembling jig from the receiving portion 15.

FIGS. 10 through 13 illustrate another preferred embodiment photo film cassette 35, in which an access opening 53 and a covering plate 54 are associated with a retaining hook 46. The inside of shell halves 37 and 38 are provided with a pair of ridges 40. When a roll of photo film 62 (see FIG. 12) is contained in a cassette shell 36 with a spool 39, the ridges 40 are in contact with the outer turn of the roll, and prevent the roll from loosening. When the spool 39 is rotated in the unwinding direction, the roll is also rotated in the cassette shell 39. A reference numeral 41 designates a separator claw.

Plush or light-trapping ribbons 44 and 45 are adhered to port tongues 37a and 38a, and prevent ambient light from passing through a passage port 43 and shield the ambient light from the inside of the cassette shell 36. Reference numerals 37c and 38b designate recessed faces on which a sticker or label 63 is adhered.

The cassette shell 36 is provided with a hinge section 50 constituted of a shaft 51 and a bearing 52. The shaft 51 is formed on the lower shell half 38. The bearing 52 is formed on the upper shell half 37, and to be arcuate without complete circular shape. The shaft 51 is mounted on the outside of the bearing 52, which receives the shaft 51 in rotatable fashion. Two reverse faces of the bearing 52 are provided with respective ridges 52a and 52b of which a section is triangular. While the shaft 51 and the bearing 52 is assembled together, the tips of the ridges 52a and 52b are partially deformed by the contact with the shaft 51 and an outer portion 42. Even when there is a small deviation in sizes of the shaft 51 and the bearing 52, such a deviation is absorbed by partial deformation of the ridges 52a and 52b, so as to tighten the connection sufficiently between the shaft 51 and the bearing 52 while reducing a play to a negligible amount.

Two receiving portions 47 are formed on the upper shell half 37, and are formed on respective recessed faces 37b in the upper shell half 37. When the shell halves 37 and 38 are joined, the retaining hook 46 is retained on each receiving portion 47, while an access opening 53 is formed to cause the recessed face 37b appear in the top. When the retaining hook 46 is to be disengaged from the receiving portion 47, an external release jig is inserted into the access opening 53. A surface inside the access opening 53 is so inclined as to guide the release jig, in a direction toward a position where the release jig lies between the receiving portion 47 and the retaining hook 46 to stand by for applying force to the retaining hook 46.

The covering plate 54 is formed on the upper shell half 37, and defines a lateral face of the access opening 53. The covering plate 54 is connected via a thin connection 55 to the upper shell half 37, and can be cut off by cutting down the thin connection 55. When the covering plate 54 is cut off from the cassette shell 36, the release jig for the retaining hook 46 is allowed to access to the retaining hook 46 through a gap where the covering plate 54 has been located. Note that the covering plate 54 is cut off before the photo film as exposed is developed.

A reference numeral 39a designates a pair of flanges, which are formed on a core 39b of the spool 39. Ends of the core 39b has respective keys 56, with one of which a drive shaft of an external apparatus, such as a photo film processor, is engaged for rotating the spool 39. A respective notch 56a is formed in the core ends of the spool 39.

Figure 14:
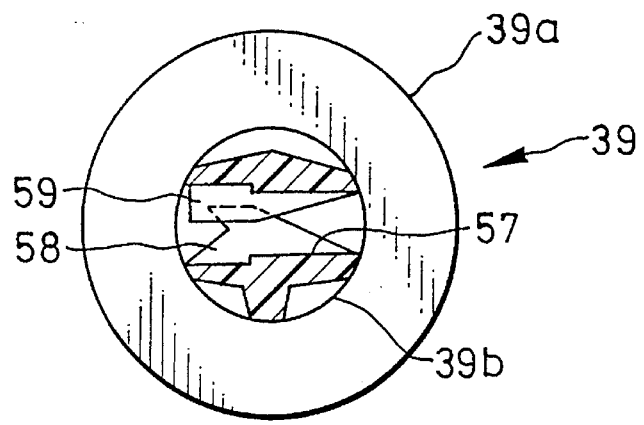
FIG. 14 is a cross section illustrating a spool of the photo film cassette.
Figure 15:
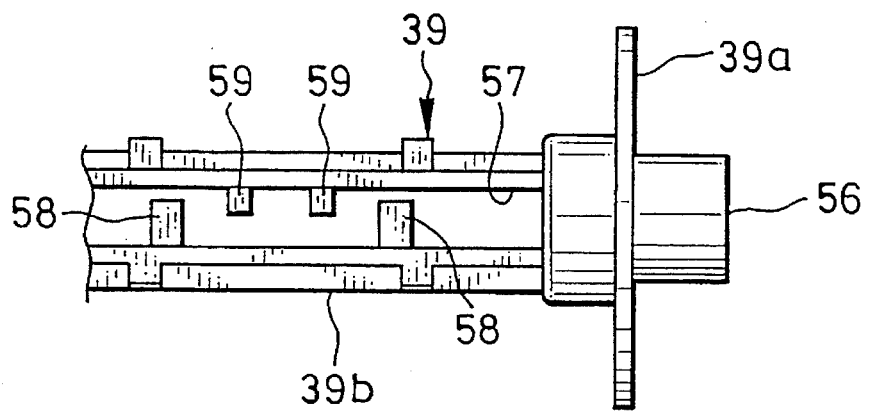
FIG. 15 is a partially cutaway front elevation illustrating the spool.

Referring to FIGS. 14 and 15, a pair of retaining hooks 58 and a pair of slip-preventing ridges 59 are formed in a slot 57 in the core 39b. As viewed in FIG. 14, the right of the slot 57 constitutes an entrance for a trailer 62a of the photo film 62.

Figure 16:
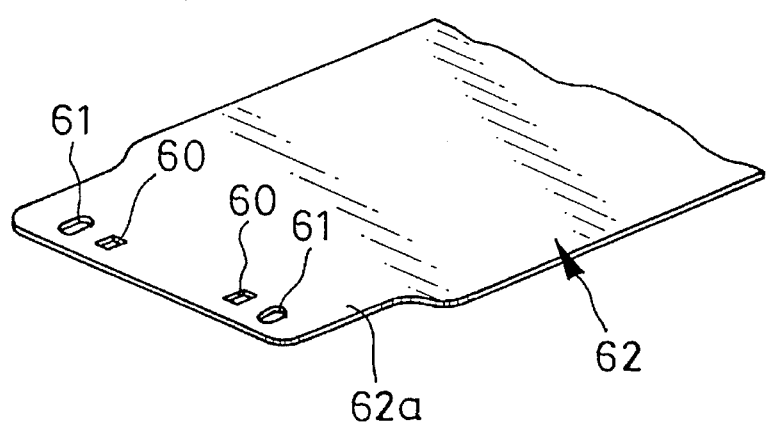
FIG. 16 is a perspective view illustrating a trailer of photo film to be retained into the cassette.

The trailer 62a of the photo film 62, as illustrated in FIG. 16, is provided with two retaining holes 60, which are engaged with the retaining hooks 58. The ridges 59 press the trailer 62a in the direction opposite to projecting of the retaining hooks 58, so that the holes 60 are prevented from disengagement from the retaining hooks 58, even if a force for pulling the photo film 62 from the slot 57 should be applied to the trailer 62a. The trailer 62a is further provided with two pick-up holes 61 at the interval wider than the retaining holes 60. The pick-up holes 61 are used in operation of inserting the trailer 62a into the slot 57.

The operation of the above embodiment is described. At first, while containing the unexposed photo film 62, the photo film cassette 35 has a contour, illustrated in FIG. 10, on which the covering plate 54 is kept uncut. A photographer loads a camera with the cassette 35, with the leader of the photo film 62 completely contained in the cassette shell 36.

Figure 17:
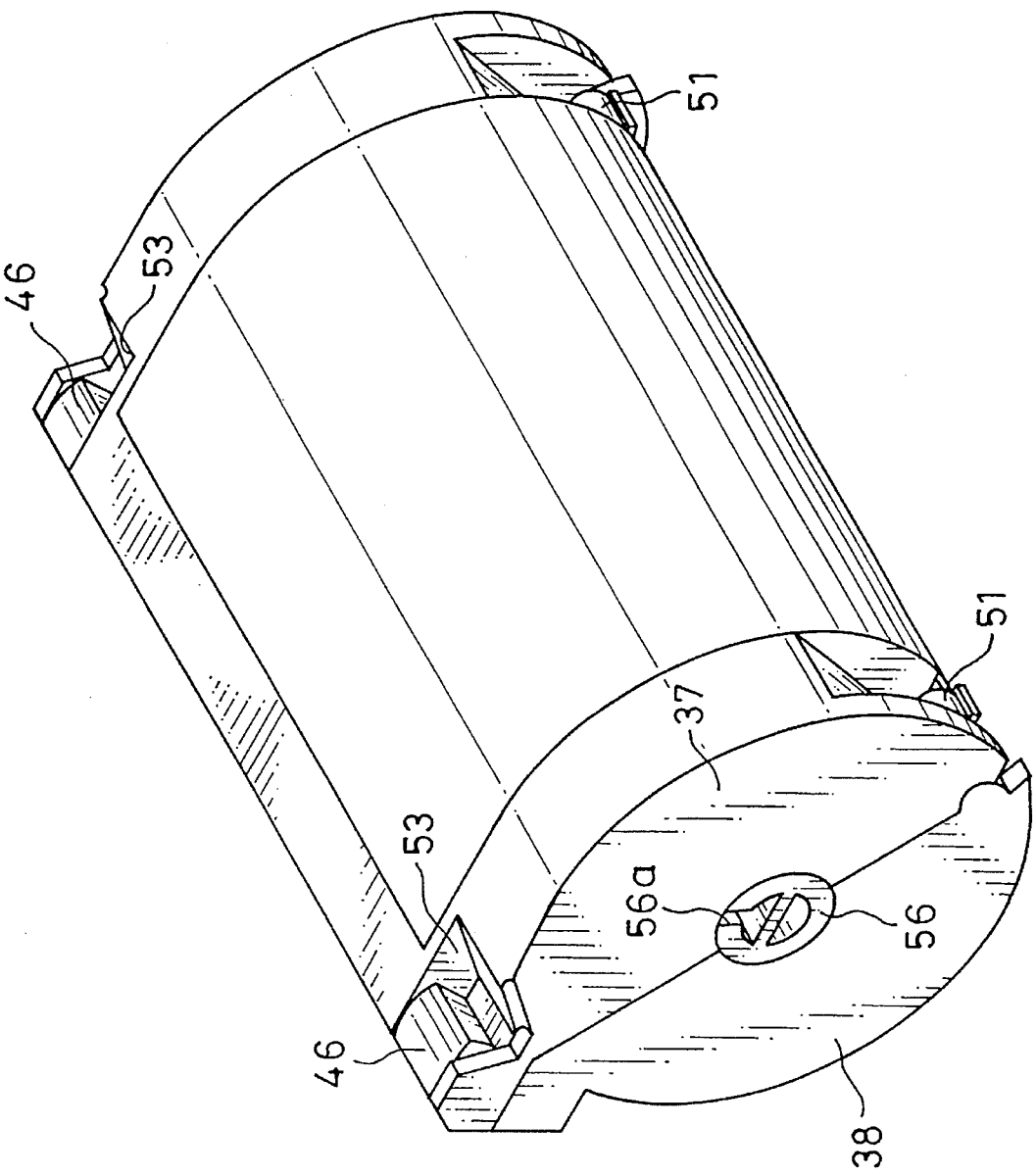
FIG. 17 is a perspective view illustrating the photo film cassette from which a covering plate is cut away.

After photography by use of the photo film 62, the cassette shell 36 containing this is removed from the camera, so that the cassette 35 is forwarded to a photo laboratory, where the covering plate 54 is cut off along the thin connection 55, so as to be in the contour of FIG. 17.

The cassette 35 without the covering plate 54 is set into a photo film processor. A holder chamber for receiving the cassette 35 is formed in a photo film removing device incorporated in the photo film processor. The holder chamber has a light-tightly enclosing door, which is closed to enclose the cassette 35 in the holder chamber in fashion of a darkroom.

The photo film removing device is constructed to be usable also as a photo film loading device, and includes a shell opener/shutter, a trailer separator/inserter, and a spool driver. In the photo film removing device, the shell opener/shutter operates for opening the cassette shell 36. The trailer separator/inserter operates for separating the trailer 62a. The shell opener/shutter is constituted of pressing rods 70 and 71, an opener/shutter arm 72 and a clamp 79 (See FIG. 18). The pressing rods 70 and 71 are adapted to pressing the retaining hooks 46 for disengaging them from the receiving portions 47. The opener/shutter arm 72 swings from a retracted position to a pressing position where it presses the upper shell half 37. The clamp 79 clamps the port tongue 37a of the upper shell half 37 while the opener/shutter arm 72 stands in the pressing position.

The spool driver is constituted of a fork 73, a motor 75 and a slide frame 76. The fork 73 is engaged with the key 56 of the spool 39. The motor 75 drives the fork 73. The slide frame 76 slides the motor 75 and the fork 73. The trailer separator/inserter is constituted of a separator plate 81, a separator/inserter arm 74 and a stepping motor 80. The separator/inserter arm 74 is swingable from a retracted position to a position where the separator plate 81 is inserted in the slot 57 in the spool 39. The stepping motor 80 swings the separator/inserter arm 74.

While a lid of the removing device is open, the cassette 35 is moved down to be loaded into the removing device. Before the loading of the cassette 35, the opener/shutter arm 72 and the slide frame 76 stand retracted. After the cassette 35 is set, the opener/shutter arm 72 comes to the pressing position. Then the pressing rods 70 and 71 are inserted into the access openings 53, and disengage the retaining hooks 46 from the receiving portions 47. A cylinder 78 is actuated to cause the clamp 79 to clamp the upper shell half 37. In advancement of the pressing rods 70 and 71, the retaining hooks 46 are prevented from damage or breakage because the pressing rods 70 and 71 are guided by the inside of the access openings 53. Never is the passage port 43 blocked by the clamp 79. Even while the clamp 79 is clamping the upper shell half 37, the photo film 62 is movable out of the cassette shell 36 through the passage port 43. Then the slide frame 76 is moved to the drive position. The fork 73 is engaged with the key 56.

Figure 18:
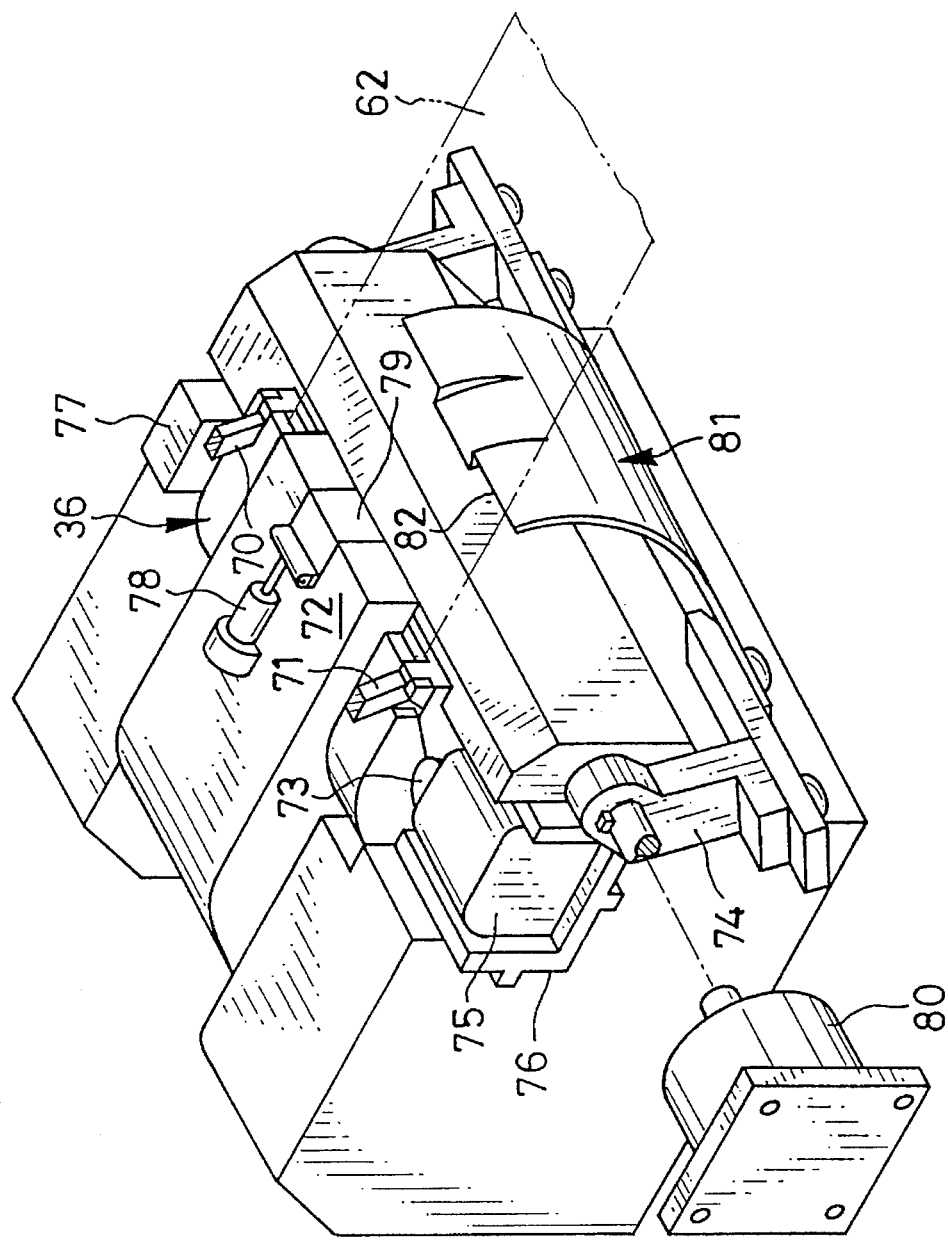
FIG. 18 is a perspective view illustrating a photo film removing/loading device operated for removal of the photo film.
Figure 19:
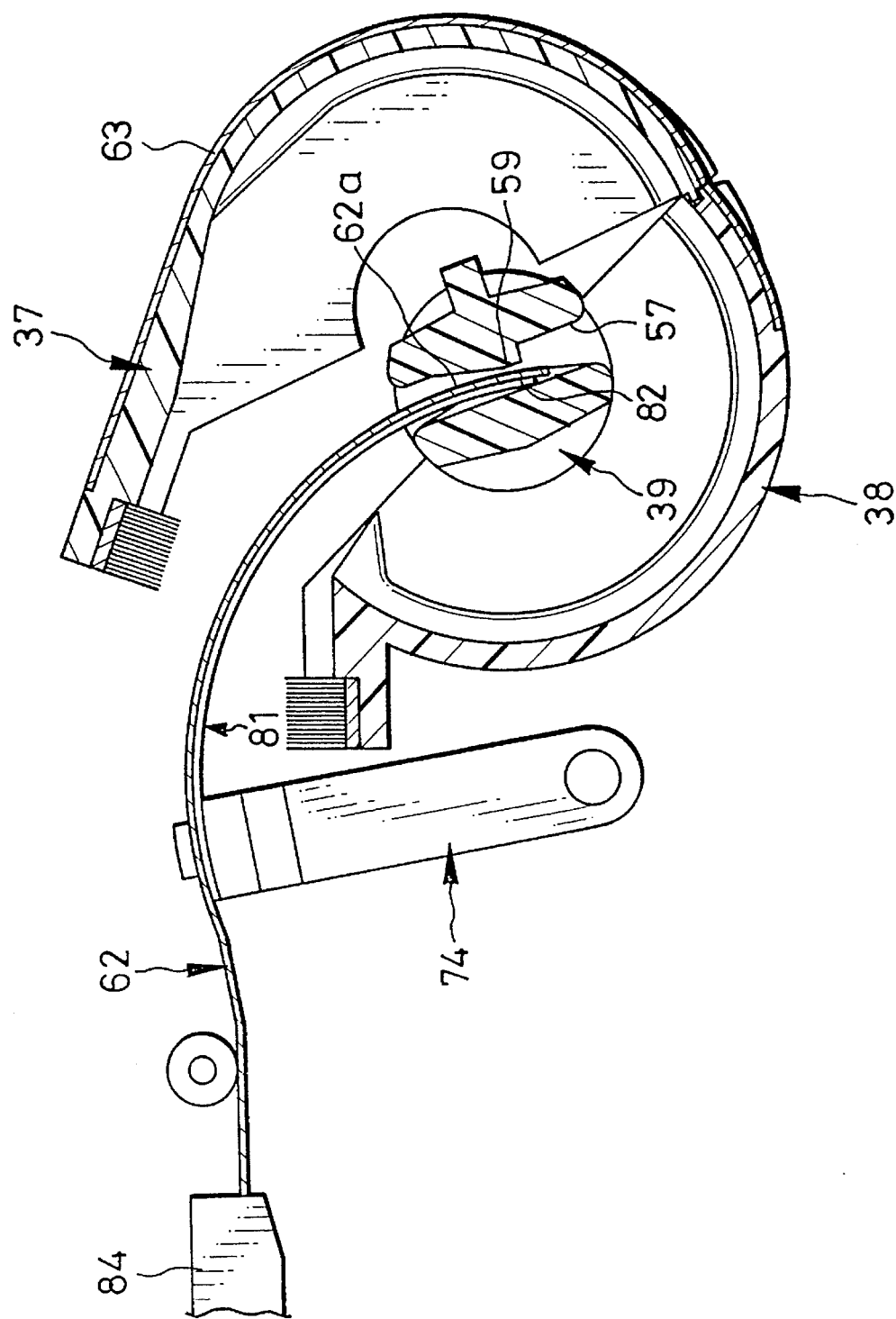
FIG. 19 is an explanatory view in section illustrating the removal of the photo film from the photo film cassette.

When the fork 73 is firmly engaged with the key 56, the spool driver is actuated to drive the spool 39 in the winding direction, namely counterclockwise in FIG. 18. The spool 39 is thus rotated. The leading end of the photo film 62 is rotated with the spool 39, and separated by the separator claw 41 to move through the passage port 43. Further rotation of the spool 39 advances the exposed photo film 62 outward from the passage port 43 and sends it into the photo film processor.

The photo film 62 is advanced into the photo film processor at a predetermined length. A drawing mechanism in the photo film processor is then actuated to draw the photo film 62 from the cassette shell 36. The spool driver no further drives the fork 73. The photo film 62 is advanced into the photo film processor by being drawn.

Nearly all the exposed photo film 62 is drawn out of the cassette shell 36. As the trailer 62a of the photo film 62 stands retained on the core 39b of the spool 39, the photo film 62 stops being drawn out. The photo film processor incorporates a tension meter, which checks the tension of the photo film 62 and detects the state where nearly all the exposed photo film is drawn out. Upon this detection, the photo film processor is stopped from drawing out the photo film 62.

The photo sensor 77 monitors the position of the notch 56a at the key 56 and, before the notch 56a comes to the predetermined position, sends a signal causing the motor 75 to rotate. When the notch 56a has come to the predetermined position, the photo sensor 77 sends a stop signal to the motor 75. The spool 39 is so stopped as to direct the entrance of the slot 57 in the core 39b to a gap where the passage port 43 is opened.

The opener/shutter arm 72 is next swung at a rotational angle as predetermined, to swing the upper shell half 37 about the shaft 51 of the hinge section 50. Even when the upper shell half 37 is opened away from the lower shell half 38, the sticker 63 is kept from being twisted or damaged, because the recessed faces 37c and 38b for adhesion of the sticker 63 are defined as cylindrical to have a center in parallel to the shaft 51. Note that it is preferable to move away the upper shell half 37 until the width of the passage port 43 increases in a range from 1 to 4 mm.

The separator/inserter arm 74 is rotated by the stepping motor 80. A front edge 82 of the separator plate 81 is entered into the gap between the shell halves 37 and 38, along the emulsion surface of the photo film 62, directed to the bottom as viewed in the drawings. The front edge 82 of the separator plate 81 enters the slot 57 deeply. Therefore, it is favorable to form the gap between the shell hales 37 and 38, because the separator plate 81 can be moved inward reliably. The separator/inserter arm 74, the separator plate 81 and the front edge 82 can have reliability even with reduced precision in size. It is also advantageous to prevent the plush 44 and 45 from being damaged.

Figure 20:
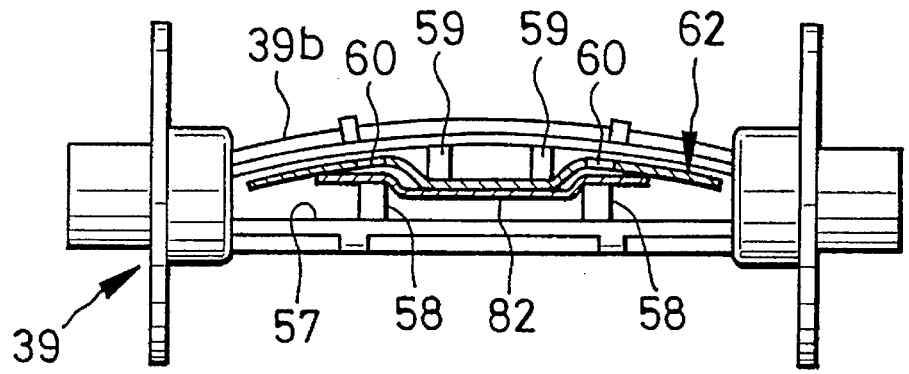
FIG. 20 is an explanatory view illustrating an insertion of a separator plate into a slot in the spool.

FIG. 20 illustrates the front edge 82 of the separator plate 81 as thrust deeply into the slot 57. The preventive ridges 59 on the upside of the slot 57 abut on the lowered portion of the front edge 82. Lateral raised portions press the upside of the slot 57 upward, to deform the core 39b curvedly. The raised portions, as thrust, ride the retaining hooks 58, are inserted between the photo film 62 and the retaining hooks 58, and disengage the retaining holes 60 from the hooks 58, until the trailer 62a is released from retention on the spool 39.

Note that photoelectric detection of the notch 56a may be omitted to omit the checking of the rotational orientation of the slot 57 in the spool 39, because the tension is applied to the photo film 62 to direct the slot 57 to the gap for the passage port 43.

It is also to be noted that, in the above separating operation, the retaining hooks 46 are disengaged before the spool 39 is rotated for exiting the leader of the photo film 62. Alternatively, the spool 39 can be rotated for exiting the leader before the retaining hooks 46 can be disengaged.

After the separator/inserter arm 74 is swung at the predetermined angle, a photo film conveying mechanism incorporated in the photo film processor is driven. The entirety of the photo film 62 is passed through processing tanks successively in the processor, to be developed automatically. The developed photo film 62 is then received by another conveying mechanism, which conveys the photo film 62, so as to direct the trailer 62a to the holder chamber of the removing device to be used as loading device.

Figure 21A:
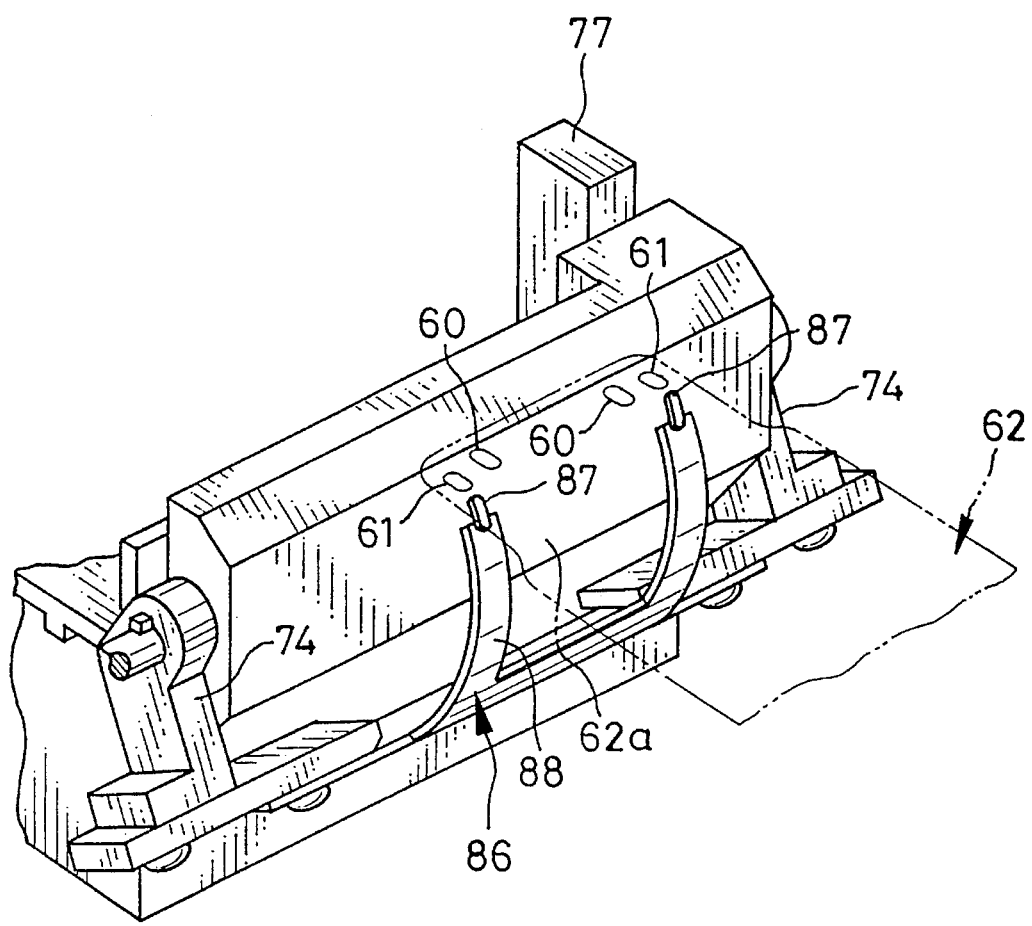
FIG. 21A is a perspective view illustrating the photo film removing/loading device operated for loading of the photo film.

The cassette 35 from which the photo film 62 is removed is also used for containing the developed photo film 62. The operation of inserting the trailer 62a into the spool 39 is now described. In the photo film loading device in the photo film processor, the shell opener/shutter operates for closing the cassette shell 36. A trailer separator/inserter operates for inserting the trailer 62a. The separator/inserter arm 74 initially stands by as in FIGS. 21A and 21B. The stepping motor 80 is energized to drive the separator/inserter arm 74 to make rotation of a predetermined angle. An inserter plate 86 is substituted for the separator plate 81, and rotates together with the separator/inserter arm 74, to engage pickup claws 87 with the pick-up holes 61 in the trailer 62a of the photo film 62. Further rotation of the separator/inserter arm 74 causes the pick-up claws 87 to pick up the trailer 62a, and pulls the photo film 62 from a feeder 84.

Figure 22:
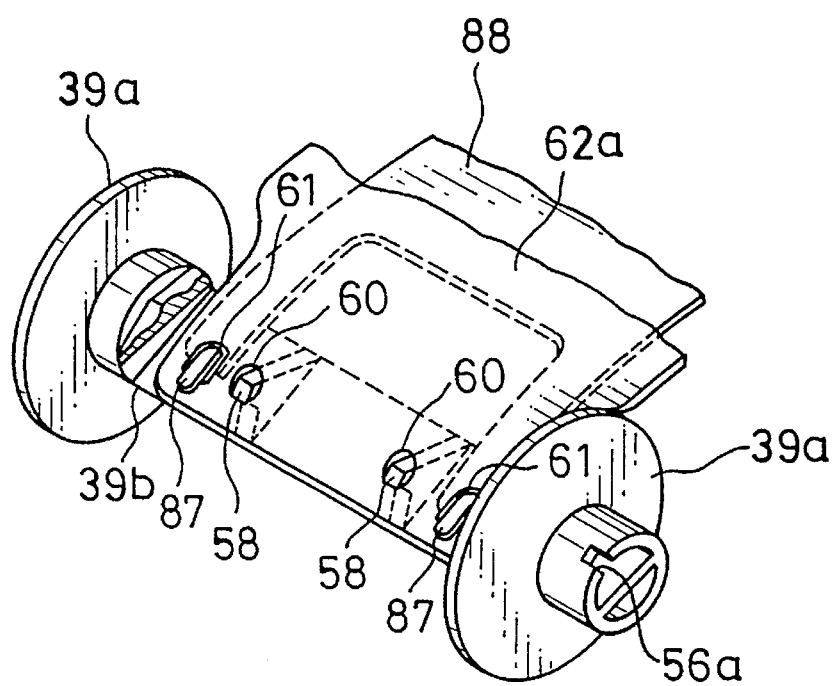
FIG. 22 is a partially cutaway perspective view illustrating the insertion of the trailer into the spool slot with an inserter plate.

Rotation of the separator/inserter arm 74 causes the pick-up claws 87 to come between the shell halves 37 and 38 with the trailer 62a picked up, and into the cassette shell 36. The pick-up claws 87 are inserted into the slot 57 formed in the core 39b. In the course of the insertion of the pick-up claws 87 into the slot 57, the trailer 62*a* as picked up by the pick-up claws 87 comes into the location between the retaining hooks 58 and the ridges 59, so as to fit the retaining hooks 58 into the holes 60, as illustrated in FIG. 22. The inserter plate 86 could be rubbed on the inside walls of the slot 57, but is so flexible that the pick-up claws 87 can be passed fully through the slot 57, without great resistance to insertion of the inserter plate 86 into the slot 57. Note that the upper wall of the slot 57 is omitted from FIG. 22.

With the trailer 62*a* retained on the core 39*b* of the spool 39, the separator/inserter arm 74 rotates back to the standby position as illustrated in FIG. 21B, while pulling the pick-up claws 87 out of the cassette shell 36. The retaining hooks 58 are so shaped as to keep the photo film 62 from moving in the direction toward the passage port 43. Once the holes 60 are retained on the retaining hooks 58, never are the holes 60 disengaged from the slot 57 even though the inserter plate 86 is pulled out of the slot 57.

After the separator/inserter arm 74 is brought back to the standby position, the fork 73 is driven by the motor 75 to rotate the spool 39 in the clockwise direction as viewed in FIG. 21B. The photo film 62 is wound up around the core 39*b* of the spool 39. The photo film 62 is further drawn out of the feeder 84 by tension due to rotation of the spool 39, while being wound into the cassette shell 36. When a predetermined length of the photo film 62 is passed through the feeder 84, the motor 75 is stopped from rotating the spool 39. The entirety of the photo film 62 is finally contained in the cassette shell 36.

After the motor 75 is stopped, the opener/shutter arm 72 is rotated to the pressing position, where the upper shell half 37 is joined to the lower shell half 38. Pushing of the upper shell half 37 against the lower shell half 38 causes the retaining hooks 46 to retain the receiving portion 47. After the swing of the opener/shutter arm 72, the cylinder 78 is actuated to release the clamp 79 to release the opener/shutter arm 72 from the upper shell half 37. The opener/shutter arm 72 is further swung to the retracted position. The slide frame 76 is so moved as to move the fork 73 away from the key 56. Then the photo film loading operation of the loading device is terminated.

After this, an operator using the photo film processor opens the lid of the holder chamber of the loading device, and takes out the photo film cassette 35, which is then set into a holder chamber of a printer-processor.

The printer-processor also incorporates a photo film removing/loading device similar to the above. The device is additionally provided with a sensor, which is disposed in the holder chamber for checking existence of the covering plate 54. After the cassette 35 is set, the sensor operates. When it detects existence of the covering plate 54, the sensor generates a signal for causing a display panel to indicate information of abnormality, for the purpose of informing that the photo film contained in the cassette is unexposed or undeveloped. It is thus possible for the use of the sensor to inhibit the printer-processor from using the photo film before development.

Once absence of the covering plate 54 is detected by the sensor, the developed photo film 62 is exited from the cassette shell 36 by the spool driver of the removing/loading device. Then the shell opener/shutter opens the upper shell half 37. The trailer separator/inserter disengages the trailer 62*a* from the spool 39. The printer-processor draws the entire photo film 62 out of the cassette shell 36, and subjects the photo film 62 to printing photographs. After the printing operation, the developed photo film 62 is conveyed with the trailer 62*a* directed ahead, treated by the removing/loading device, and loaded into the cassette shell 36 again.

In the above embodiment, the printer-processor is provided with the removing/loading device for the photo film 62 for being automatically supplied with the photo film 62. Alternatively the printer-processor can lack the removing/loading device, and supplied with the developed photo film 62 manually. This requires a manual operation of removing the photo film 62 from the cassette 35. An operator may use a small screwdriver with a tip shaped as a minus sign, and release the retaining hooks 46 from the receiving portions 46. The cassette shell 36 lacks the covering plate 54. The screwdriver can be inserted into the access openings 53 through the gaps formed by the absence of the covering plate 54.

In the above embodiment, the pressing rods 70 and 71 of the removing/loading device are advanced into the access openings 53 in a direction vertical to the axis of the spool 39. Instead of this, a photo film processor can incorporate a photo film removing/loading device having alternative pressing members, which can be so disposed as to advance into the access openings 53 through the gaps formed by the absence of the covering plate 54. It is possible to use the pressing members to cut off the covering plate 54 from the cassette shell 36, additionally to operation of releasing the retaining hooks 46, because the thin connection 55 can be cut down by being pressed. This is advantageous because the operation for removing the covering plate 54 is simplified.

Figure 23:
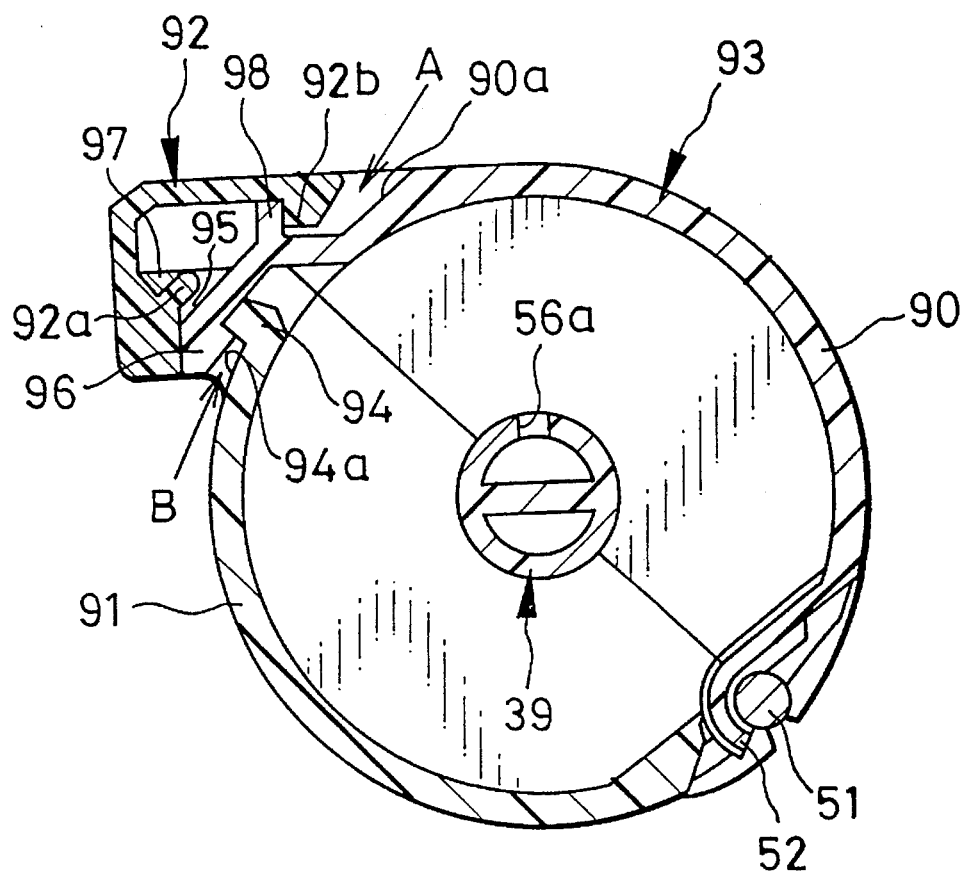
FIG. 23 is cross section illustrating a further preferred photo film cassette on which auxiliary retainers are fitted for retention.
Figure 24:
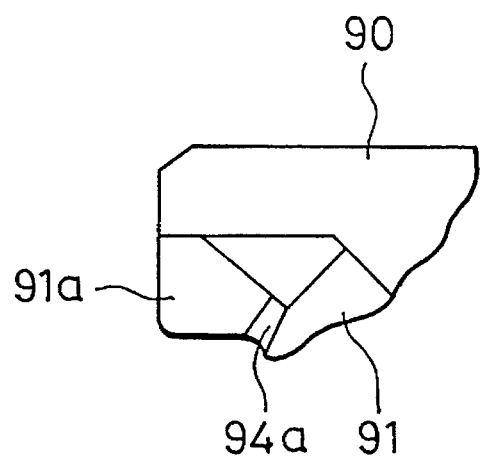
FIG. 24 is a partial side elevation illustrating the photo film cassette of FIG. 23.

FIGS. 23 and 24 illustrate another preferred photo film cassette 93, in which a pair of auxiliary retainers 92 are fitted to connect shell halves 90 and 91. Elements similar to those of the former embodiments are referred to with the identical reference numerals. Receiving portions 94 and 97 are formed on the lower shell half 91, which has an opening 95 defined between the receiving portions 94 and 97. A retaining hook 90 is formed on the upper shell half 96, is inserted into the opening 95, and retains the receiving portion 94. The auxiliary retainers 92 are located beside the passage port 43 the same as that in FIG. 12. Each auxiliary retainer has two hooks 92*a* and 92*b*, of which the former 92*a* is engaged with the receiving portion 97 through the opening 95, and the latter 92*b* is engaged with a receiving portion 98 on the upper shell half 90. The retainer 92 is used for reinforcing the retention of the shell halves 90 and 91 via the retaining hook 96 and the receiving portion 94.

Before setting the photo film cassette 93, the auxiliary retainer 92 is removed from the cassette shell. An external release jig is inserted into a hole 90*a* in a direction A in FIG. 23, to press the hook 92*b* away from the receiving portion 98, until the retainer 92 is disengaged from the receiving portions 98 and then 97.

A pair of covering plates 91*a* are formed on the lower shell half 91, as illustrated in FIG. 24. After the removal of the auxiliary retainer 92, the covering plates 91*a* are bent away and cut off. Then the photo film cassette 93 is set into a photo film processor, in which a photo film removing device has a pressing rod, which is inserted into a hole 94*a* in a direction B in FIG. 23, to press the retaining hook 96 away from the receiving portion 94, until disengagement of the upper shell half 90 from the lower shell half 91.

Figure 25:
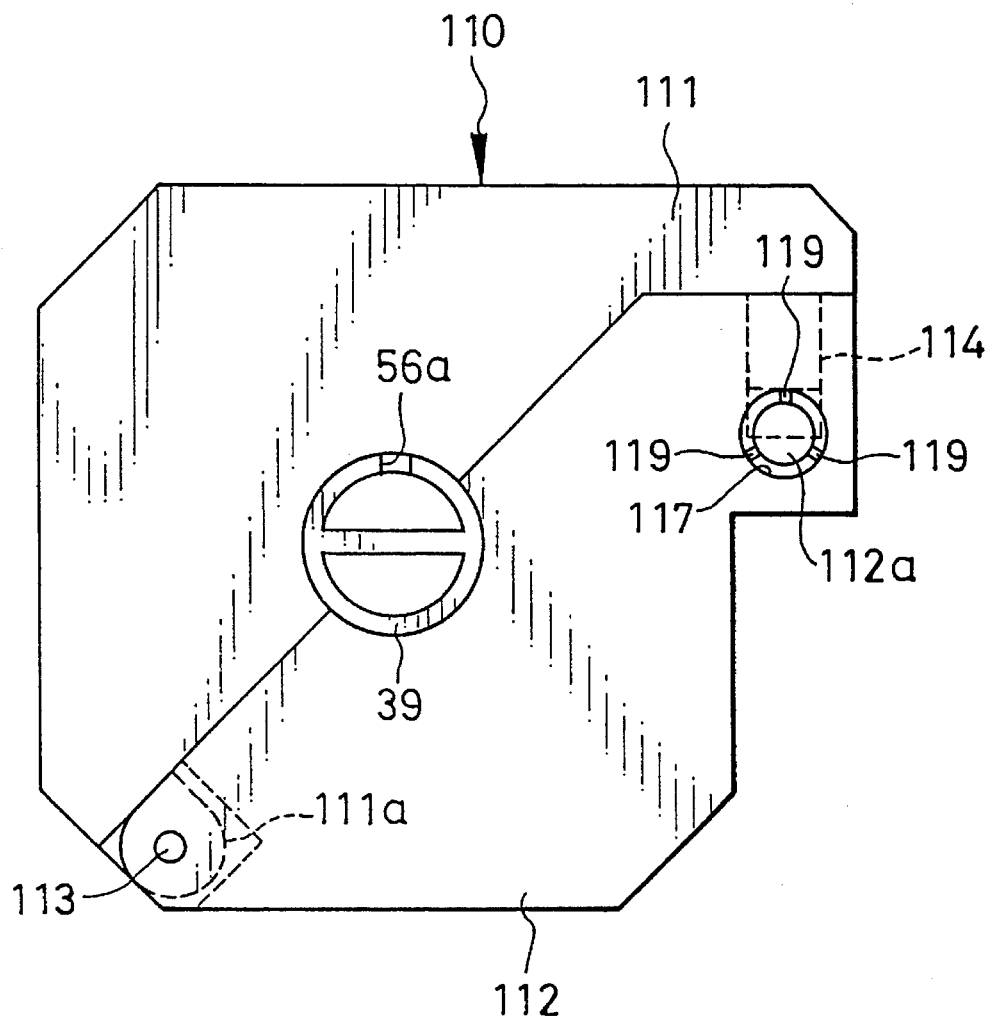
FIG. 25 is a side elevation illustrating a preferred photo film cassette in which removal of covering plates are associated with disengagement of retaining hooks.
Figure 26:
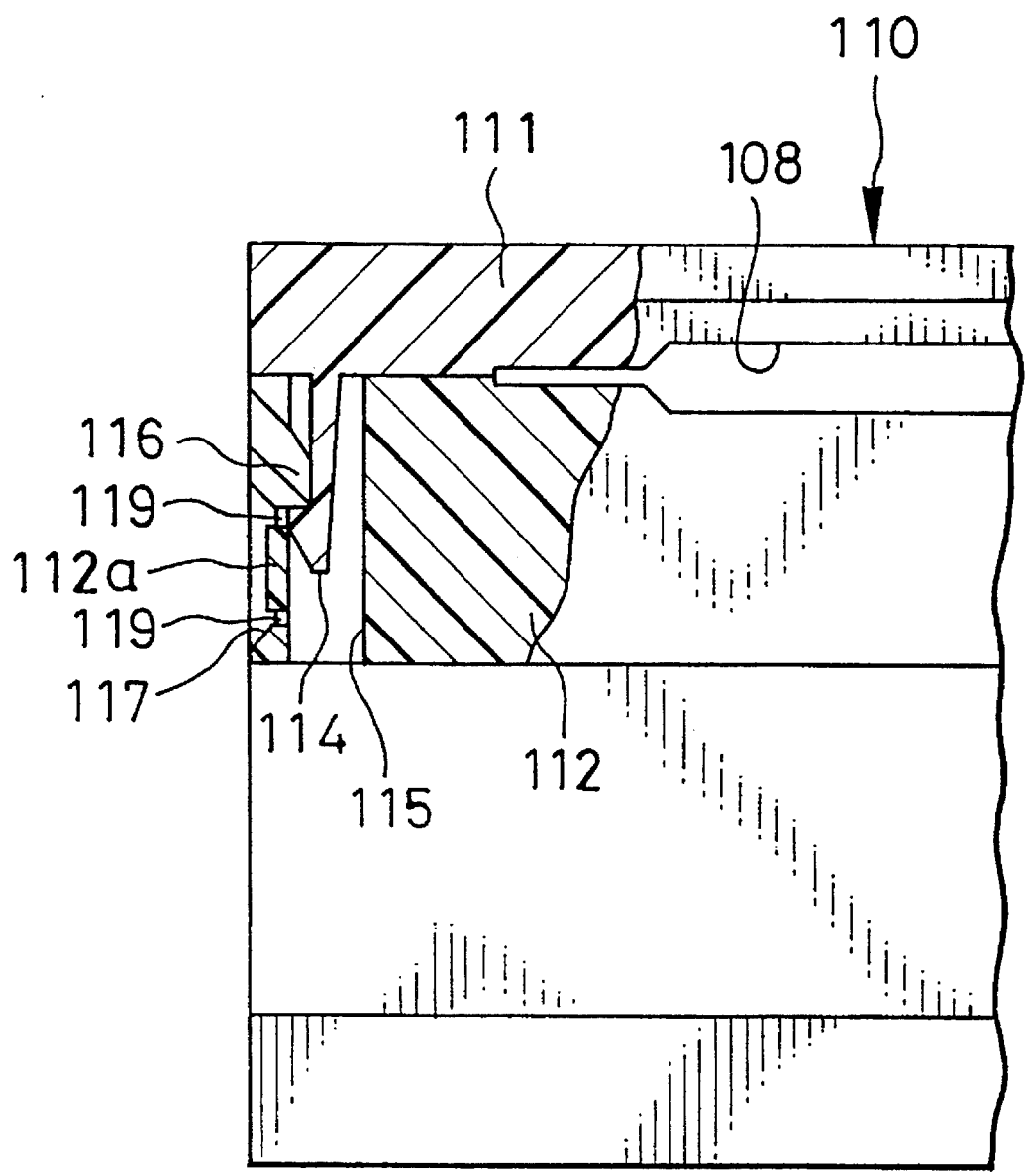
FIG. 26 is a partially broken transverse section illustrating the photo film cassette of FIG. 25.

FIGS. 25 and 26 illustrate still another preferred photo film cassette 110, in which retaining hooks 114 are accessible through end faces of the cassette 110. Elements similar to those of the former embodiments are referred to with the identical reference numerals. The cassette 110 is generally shaped like a box constituted of two shell halves 111 and 112, which are hinged by a structure in which a bearing portion 111a of the upper shell half 111 is journaled on a pin 113. The retaining hooks 114 are formed on the upper shell half 111. Receiving portions 116 are formed on the lower shell half 112, and receive the retaining hooks 114 as inserted through openings 115. In the lower shell half 112, access holes 117 are formed in respective end faces, through which the retaining hooks 114 are accessible to external release jigs.

Inside each access hole 117, a covering plate 112a is formed on the lower shell half 112, and connected via three thin connections 119 on the edge of the access hole 117. The respective covering plates 112a must be cut off before the retaining hooks 114 can be disengaged. The photo film cassette 110 is set into a photo film processor, in which a photo film removing device has a pressing rod. The pressing rod is inserted into a hole 117 in a direction toward a passage port 108, to press and cut off the covering plates 112a. The pressing rod is continuously operated to press the retaining hook 114 away from the receiving portion 116, until disengagement of the upper shell half 111 from the lower shell half 112. This embodiment is advantageous in automation of removal of the covering plates 112a, by use of the automatic photo film removing device. The operation of removing the covering plates 112a is associated with the disengagement of the retaining hooks 114, thus is prevented without fail from being missed.

Figure 27:
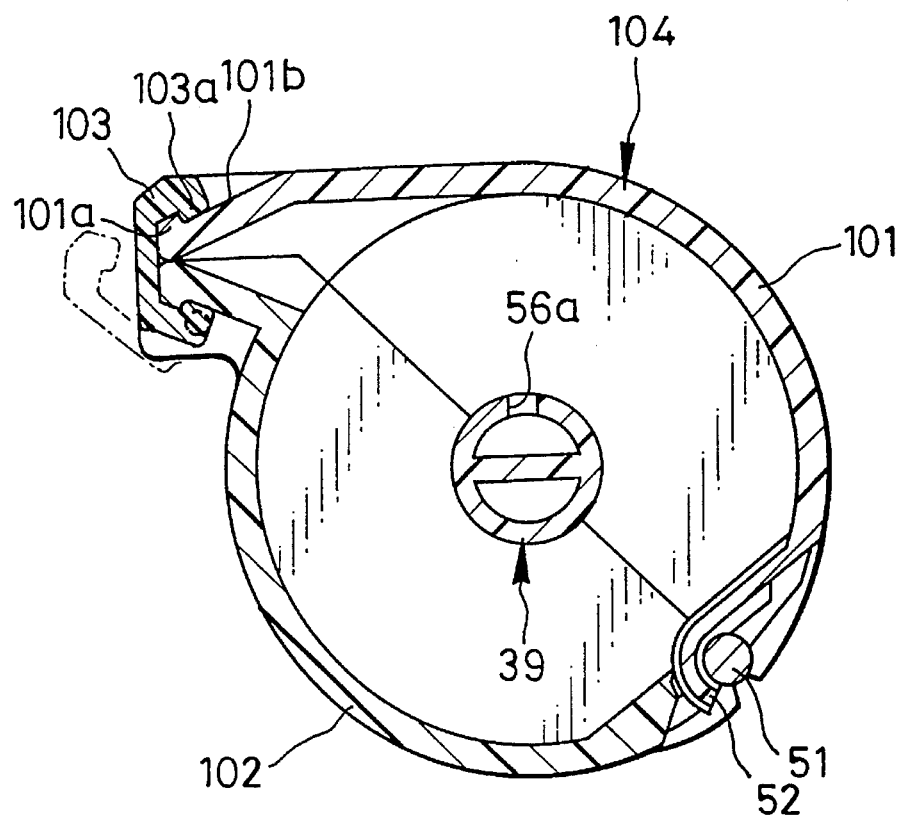
FIG. 27 is a cross section illustrating another preferred photo film cassette of which swingable retainers are mounted for retention.
Figure 28:
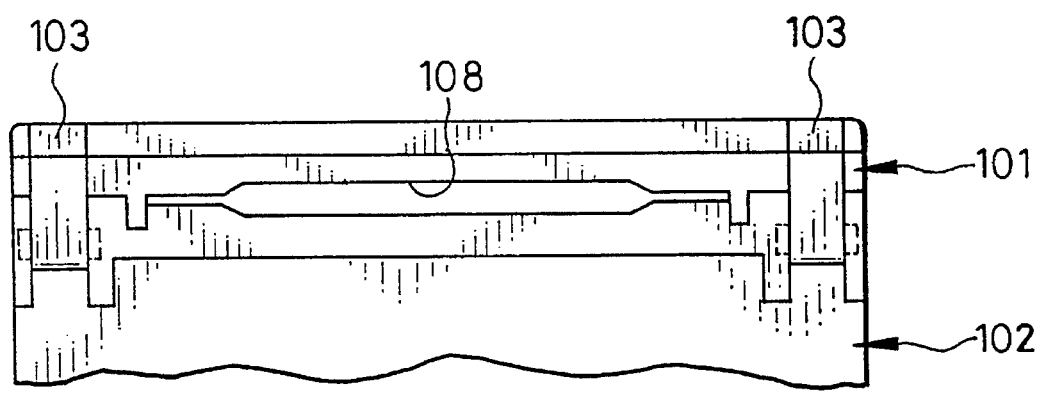
FIG. 28 is a partial front elevation illustrating the photo film cassette.

FIGS. 27 and 28 illustrate a further preferred photo film cassette 104, in which a pair of swingable retainers 103 retain an upper shell half 101 on a lower shell half 102. Elements similar to those of the former embodiments are referred to with the identical reference numerals. The retainers 103 are disposed to locate the passage port 108 between them, and supported on the lower shell half 102 in swingable fashion. A retaining hook 103a is formed on each retainer 103, and retains a receiving portion 101a formed on the upper shell half 101. A recess 101b formed in the upper shell half 101 allows access to the retaining hook 103a for disengagement. The retainer 103 is favorable in that it is easily movable between engaged and disengaged states. The retainer 103 is connected on the lower shell half 102, and prevented from being lost when disengaged. Note that preferred examples of the retainers 103 are resin such as polystyrene, polycarbonate, polyethylene, polypropylene, and nylon.

Figure 29:
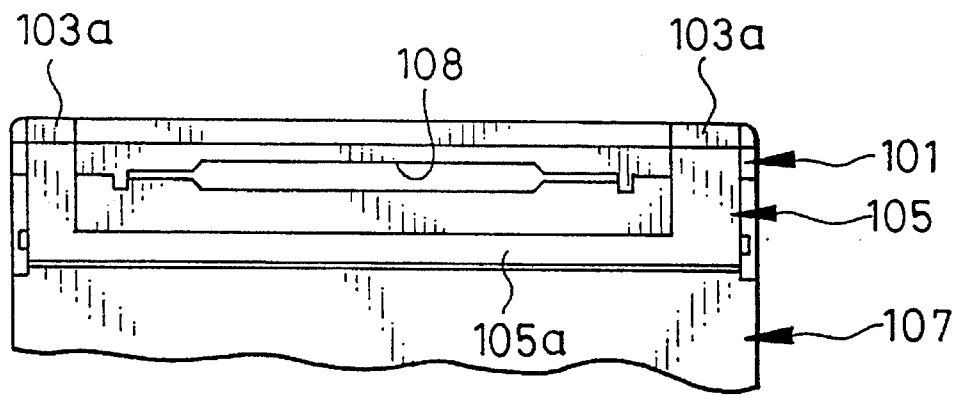
FIG. 29 is a partial front elevation illustrating a variant photo film cassette.

FIG. 29 illustrates a variant photo film cassette, in which a one-piece molded swingable retainer 105 is provided with the two retaining hooks 103a. The retaining hooks 103a are formed on a common shaft portion 105a, which is supported on a lower shell half 107 in swingable fashion.

In the above embodiments, each cassette is used for the photo film in common to states of being developed and undeveloped. Alternatively the developed photo film can be contained into a cassette prepared in different fashion from the cassette for the undeveloped photo film. In the cassette having the at least one swingable retainer 103, 105, it is preferable to construct a cassette for the developed photo film to have the swingable retainer colored differently from that of the cassette for the undeveloped photo film. This is favorable in view of apparent discernment of status of the photo film.

Note that it is possible to regulate the spool 39 in the same rotational orientation beforehand during the transportation of the empty cassette into the loading device. This can cause omission of the photo sensor 77 from the base of the loading device.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film cassette in which a cassette shell contains a spool in rotatable fashion with a photo film wound thereabout to be a roll, and in which rotation of said spool in an unwinding direction causes said photo film to advance to an outside through a passage port, said photo film cassette comprising:

first and second shell halves constituting said cassette shell, a front edge of said first shell half and a front edge of said second shell half defining an opening of said passage port;

hinge means for connecting said shell halves in swingable fashion, said passage port located in said cassette shell in opposition to said hinge means;

two retaining means, disposed on said cassette shell and respectively beside said passage port, for fixedly securing said shell halves, each of said retaining means constituted of a retaining claw disposed on said front edge of said first shell half, and a receiving portion formed on said front edge of said second shell half and engaged with said retaining claw for retaining said retaining claw, said receiving portions each defining elongated surfaces which lie in planes that extend parallel to a widthwise direction of the photo film; and two access openings formed in said cassette shell for rendering said retaining means respectively accessible externally, to allow external disengagement of said retaining means.

2. A photo film cassette as defined in claim 1, wherein said shell halves are resinous.

3. A photo film cassette as defined in claim 2, further comprising a second receiving portion formed on said second shell half, and engaged with said retaining claw prior to engagement of said receiving portion with said retaining claw, said second receiving portion keeping said shell halves relatively partially separate from one another, to retain said shell halves in preliminary fashion, before said shell halves are joined up.

4. A photo film cassette as defined in claim 2, further comprising a retainer member mounted on said first shell half, and provided with said retaining claw, to be swingable between a retained position where said retaining claw is retained on said receiving portion, and a released position where said retaining claw is released from said receiving portion.

5. A photo film cassette as defined in claim 4, wherein said retainer member comprises two retainer members each of which is disposed beside said passage port and provided with said retaining claw.

6. A photo film cassette as defined in claim 5, wherein said passage port has first and second walls, said first wall is formed on said first shell half so as to confront an inwardly faced surface of said photo film while wound as said roll, and said second wall is formed on said second shell half so as to confront an outwardly faced surface of said photo film while wound as said roll.

7. A photo film cassette as defined in claim 2, further comprising at least one covering member mounted on said cassette shell in removable fashion, for covering said access openings partially, to hinder access to said retaining means.

8. A photo film cassette as defined in claim 7, wherein said covering member is formed on an end face of said second shell half.

9. A photo film cassette as defined in claim 7, wherein said hinge means includes:

a bearing member projected from either said first or said second shell half; and a shaft member disposed on a shell half different from said bearing member for supporting said bearing member in swingable fashion on said latter shell half.

10. A photo film cassette as defined in claim 9, wherein said retaining claw is depressed toward said passage port when disengaged from said receiving portion.

11. A photo film cassette as defined in claim 9, wherein an outside of said bearing member has an arcuate concave face, on which said shaft is received in rotatable fashion.

12. A photo film cassette as defined in claim 11, wherein said retaining claw is pressed away from said spool when disengaged from said receiving portion.

13. A photo film cassette as defined in claim 12, wherein said passage port has first and second walls, said first wall is formed on said first shell half so as to confront an inwardly faced surface of said photo film while wound as said roll, and said second wall is formed on said second shell half so as to confront an outwardly faced surface of said photo film while wound as said roll.

14. A photo film cassette in which a cassette shell contains a spool in rotatable fashion with a photo film wound thereabout to be a roll, and in which rotation of said spool in an unwinding direction causes said photo film to advance to an outside through a passage port, said photo film cassette comprising:

first and second shell halves constituting said cassette shell, a front edge of said first shell half and a front edge of said second shell half defining an opening of said passage port; and two retaining means, disposed on said cassette shell and respectively beside said passage port, for fixedly securing said shell halves, each of said retaining means constituted of a retaining claw disposed on said front edge of said first shell half, and a first receiving portion formed on said front edge of said second shell half and engaged with said retaining claw for retaining said retaining claw, said first receiving portion defining elongated surfaces which lie in planes that extend parallel to a widthwise direction of said photo film.

15. A photo film cassette as defined in claim 14, further comprising a second receiving portion formed in said second shell half, and engaged with said retaining claw prior to engagement of said first receiving portion with said retaining claw, said second receiving portion keeping said shell halves relatively partially separate from one another, to retain said shell halves in preliminary fashion, before said shell halves are joined up.

16. A photo film cassette as defined in claim 15, wherein said retaining claw is moveable away from said spool to allow said retaining claw to be disengaged from said first and second receiving portions.

17. A photo film cassette as defined in claim 16, wherein said passage port has first and second walls, said first wall is formed on said first shell half so as to confront an inwardly faced surface of said photo film while wound as said roll, and said second wall is formed on said second shell half so as to confront an outwardly faced surface of said photo film while wound as said roll.

18. A photo film cassette as defined in claim 17, further comprising a shutter rod supported inside said passage port between said first and second shell halves in rotatable fashion between closed and open positions, said shutter rod having a slot formed therein, wherein said shutter rod in said closed position causes said slot to erect inside said passage port to block said passage port for prevention of ambient light from entry into a roll chamber inside said cassette shell, and said shutter rod in said open position aligns said slot with said passage port to allow said photo film to pass.

19. A photo film cassette as defined in claim 17, further comprising:

a lever disposed in said cassette shell in externally operable fashion, connected to said shutter rod, and swung from a locking position to an unlocking position in response to external operation;

a locking portion formed on said lever for regulating rotation of said shutter rod, wherein said locking portion of said lever in said locking position locks said shutter rod in said closed position, and said locking portion of said lever in said unlocking position unlocks said shutter rod; and a retaining portion disposed on an inside of said cassette shell for retaining said locking portion in said locking position.

20. A photo film cassette as defined in claim 19, further comprising:

a gear portion disposed around said spool; and a latch claw disposed on said lever and engaged with said gear portion to latch said spool relative to said cassette shell, said lever operated externally before said spool is rotated, said gear portion rotating to press said latch claw, said lever swung to said unlocking position.

21. A photo film cassette in which a cassette shell contains a spool in rotatable fashion with a photo film wound thereabout to be a roll, and in which rotation of said spool in an unwinding direction causes said photo film to advance to an outside through a passage port, said photo film cassette comprising:

first and second shell halves constituting said cassette shell;

hinge means for connecting said shell halves in swingable fashion, said passage port located in said cassette shell in opposition to said hinge means;

two retaining means, disposed on said cassette shell and respectively beside said passage port, for fixedly securing said shell halves, each of said retaining means constituted of a retaining claw disposed on said first shell half, and a receiving portion formed on said second shell half and engaged with said retaining claw for retaining said retaining claw, said retaining claw being mounted on a retainer member which is mounted on said first shell half to be swingable between a retained position where said retaining claw is retained on said receiving portion, and a released position where said retaining claw is released from said receiving portion, said retainer member comprises two retainer members each of which is disposed beside said passage port and provided with said retaining claw; and two access openings formed in said cassette shell for rendering said retaining means respectively accessible externally, to allow external disengagement of said retaining means.

* * * * *